United States Patent [19]

Glenn

[11] Patent Number: 4,628,344

[45] Date of Patent: * Dec. 9, 1986

[54] METHOD AND APPARATUS FOR ENCODING AND DECODING VIDEO

[75] Inventor: William E. Glenn, Fort Lauderdale, Fla.

[73] Assignee: New York Institute of Technoloy, Old Westbury, N.Y.

[*] Notice: The portion of the term of this patent subsequent to May 14, 2002 has been disclaimed.

[21] Appl. No.: 483,126

[22] Filed: Apr. 8, 1983

Related U.S. Application Data

[63] Continuation-in-part of Ser. No. 418,055, Sep. 14, 1982, Pat. No. 4,517,597.

[51] Int. Cl.⁴ ............................................. H04N 11/06
[52] U.S. Cl. ..................................... 358/12; 358/133; 358/135; 358/141
[58] Field of Search .................... 358/12, 13, 133, 135, 358/138, 141, 14, 16, 11, 140, 142

[56] References Cited

U.S. PATENT DOCUMENTS

| | | | |
|---|---|---|---|
| 2,686,831 | 8/1954 | Dome | 178/6.8 |
| 4,068,258 | 1/1978 | Bied-Charreton et al. | 358/310 |
| 4,485,401 | 11/1984 | Tan et al. | 358/141 |
| 4,517,597 | 5/1985 | Glenn | 358/141 |
| 4,521,803 | 6/1985 | Gittinger | 358/12 |

OTHER PUBLICATIONS

"Transmission Primaries and Signal Forms", T. Fujio and K. Kubota, NHK Technical Monograph, Jun. 1982, pp. 27-34.

"The Effect of Orientation on the Visual Resolution of Gratings", F. W. Campbell et al., J. Physiology, 1966, pp. 427-436.

"Detail Perception After Scene Changes in Television Image Presentations", A. J. Seyler and Z. L. Budrikis, IEEE Transactions on Information Theory, Jan. 1965, pp. 31-43.

"High-Definition Television System-Signal Standard and Transmission", T. Fujio et al., SMPTE Journal, Aug. 1980, pp. 579-584.

"Orientation Anistropy: Incidence and Magnitude in Caucasian and Chinese Subjects", B. N. Timney et al., Science, vol. 183, 1976.

"Perception and Discrimination as a Function of Stimulus Orientation: The Oblique Effect in Man and Animals", Stuart Appelle, Psychological Bulletin, 1972.

Primary Examiner—Michael A. Masinick
Assistant Examiner—Michael P. Dunnam
Attorney, Agent, or Firm—Martin Novack

[57] ABSTRACT

The disclosure is directed to an apparatus and method for encoding and/or decoding video signals for use in a compatible high definition television system or in other applications. In a form of the disclosure there is provided an encoder which includes means for storing an input frame as an array of digital pixel values, and means for interrogating the stored array and for generating a sum signal and at least one difference signal. The sum signal is representative of the sum of the pixel values in a group of pixels. The difference signal is representative of the difference between the total of the pixel values in some of the pixels in the group and the total of the pixel values of other pixels in the group. The sum signal and the difference signal are generated for a multiplicity of groups which cover the video frame. The sum signal is generated at a relatively high information refresh rate and the difference signal is generated at a relatively low information refresh rate. The decoder includes means for storing the sum signal and each of the difference signals, and means for combining the sum and difference signals to obtain an output pixel value for each pixel of an output video frame. In another form of the disclosure, electronic processing is performed to obtain low and high spatial frequency component representations of the image represented by the video signal, and these are stored in a digital memory in the encoder. Output frames of the low spatial frequency component representation are produced at a fast frame refresh rate, and output frames of the high spatial frequency component representation are produced at a slow frame refresh rate.

18 Claims, 23 Drawing Figures

METHOD AND APPARATUS FOR ENCODING AND DECODING VIDEO

BACKGROUND OF THE INVENTION

This is a continuation-in-part of U.S. Application Ser. No. 418,055 filed Sept. 14, 1982 (now U.S. Pat. No. 4,517,597). This invention relates to video signals and, more particularly, to apparatus and method for encoding and decoding video signals for use in a compatible high definition television system as well as in other applications.

It is well recognized that it would be desirable to have television exhibit higher definition for the viewer. The Society of Motion Picture and Television Engineers ("SMPTE") convened a study group to study various aspects of high definition television systems, including such systems for use in the home. The SMPTE study group concluded, among other things, that any new service which provides higher definition television than is conventionally broadcast (i.e., more elements per line and lines per frame, and thus a wider bandwidth necessary for transmission) should serve existing home television receivers with essentially all the picture attributes and quality of which the receivers are capable (see SMPTE Journal, Volume 89, No. 3, pp. 153–161, March, 1980). As an example, the study group cited the instance when the NTSC compatible color service was first introduced. Monochrome receivers then in the hands of the public reproduced from the color broadcasts a monochrome version of the broadcast, essentially without compromise either in electronic performance of the receivers or in the quality of the reproduction. The SMPTE study group also noted that receivers designed for new (high definition) service, should be capable of operating using the pre-existing transmissions and derive from them a result not inferior to that provided by pre-existing receivers.

The reports of the SMPTE study group indicated the difficulty of identifying the means by which an acceptable compatible system can be achieved. To applicant's knowledge, no such system has been developed. It is an object of the present invention to set forth a high definition television system which is believed to meet practical requirements of performance and compatibility and have operating parameters sufficiently flexible to fit within standards that are ultimately adopted by television industry.

It is a further object of the present invention to provide an encoding and decoding technique that is useful for transmitting or storing video information in a form that requires reduced bandwidth channels or reduced storage size, as the case may be.

SUMMARY OF THE INVENTION

The present invention is directed to an apparatus and method for encoding and/or decoding video signals for use in a compatible high definition television system or in other applications. The invention makes use, inter alia, of certain characteristics of human vision. In particular, it has been found that two different types of neurons are used in vision. One type of neuron, whch detects low resolution imagery is relatively sensitive to temporal transients and has a time constant for build-up and decay of information that is believed to be about 40 to 80 milliseconds. A second type of neuron is apparently used for transmitting relatively high resolution information from the fovea. This type neuron is believed to have a time constant of about 200 to 350 milliseconds. Also, it is believed that stimulation of the first type of neuron by a transient will inhibit reception of information from the second type of neuron for a period of 150 to 300 milliseconds. These characteristics of human visual perception allow development of an image transmission system in which the transmission bandwidth can be substantially reduced without degradation of the image as perceived by the viewer. Since rapidly changing information is, as explained, perceived at lower resolution, it is only necessary to transmit this information with the bandwidth necessary to transmit a relatively low (e.g. conventional television) resolution image at, say, 30 frames per second. Since relatively high resolution information can only be perceived in approximately one-fifth to one-third of a second, the bandwidth required to transmit the relatively higher resolution information can be effectively reduced, since an appropriately lower effective frame refresh rate is all that is necessary for its transmission. Since the relatively higher resolution imagery is inhibited after a transient, the eye is not expected to be able to detect the fact that it takes a longer time (e.g. one-fifth to one-third of a second) to present the higher resolution image.

It is generally known that video transmission systems can be provided with a frame store at the transmitting and receiving ends, and certain portions of the video information can be transmitted and stored at the receiver less frequently and then repeated during generation of the video signal at the receiver. The present invention, in addition to improving over such systems by making maximum use of observed human visual perception characteristics, also has the advantage of providing high and low definition versions of the video, if desired, and the further advantage of having the lower definition video be compatible with existing television standards.

In accordance with a form of the invention, there is provided an encoder which includes means for storing an input frame as an array of pixel values (which are preferably, although not necessarily, digital pixel values), and means for interrogating the stored array and for generating a sum signal and at least one difference signal. The sum signal is representative of the sum of the pixel values in a group of pixels. The difference signal is representative of the difference between the total of the pixel values in some of the pixels in the group and the total of the pixel values of other pixels in the group. The sum signal and the difference signal are generated for a multiplicity of groups which cover the video frame. The sum signal is generated at a relatively high information refresh rate (e.g. once each conventional television frame) and the difference signal is generated at a relatively low information refresh rate (e.g. once every three or more television frames). In an illustrated embodiment of this form of the invention, the sum signal is generated for each frame of a series of frames, and a distinct difference signal is generated for each frame of the series.

The encoded sum signal and the encoded difference signals may be converted into analog signals and modulated onto separate carriers for transmission, or transmitted in other ways. At a receiver, the sum and difference signals can be recovered from the carriers and digitized before the decoding thereof. In accordance with a feature of this form of the invention, the decoder includes means for storing the sum signal and each of the difference signals, and means for combining the sum and difference signals to obtain an output pixel value for each pixel of an output video frame. The number of pixels in the output video frames of the decoder is substantially the same as the number of pixels in the original high definition digitized video frame arrays, and the pixel values of pixels of the output video frames correspond to pixel values of the corresponding pixels of the input video frame array. In the preferred embodiment, the means in the decoder for storing the sum and difference signals comprise digital memories which are clocked in at a relatively slow clock rate and clocked out, to the combining means, at a relatively fast clock rate. The pixels output from the combining means can be converted into an output analog video signal for display.

In a disclosed embodiment of this form of the invention, each group of pixels of the stored array, as a group, covers approximately the same area as an individual pixel of conventional television resolution element. Accordingly, the sum signal, which is generated during each conventional television frame, can be adapted for use by a conventional television receiver and would be viewed with the same resolution as existing television. For receivers which are equipped with means for recovering the difference signals and performing the decoding, improved picture resolution (such as improvement by a factor of two in each dimension for one of the exemplary embodiments hereof) can be achieved. It will be understood, however, that different pixel group configurations can be employed to achieve different levels of visual definition improvement as compared to the lower resolution sum signal when taken alone. It will also be understood that the invention has application in systems wherein it is desirable to have video signals transmitted or stored with the same perceived resolution as in an existing system, but requiring less bandwidth due to the lower overall information rate with which it is necessary to send the higher definition information.

In a motion picture or film application of the present invention, the intermixing of encoded higher and lower resolution frames can be utilized to record video information on a relatively smaller film area than was previously required for recording of information having the same effective resolution. Also, in such applications, it may again be desirable to have the information available in both relatively low and relatively high resolution formats, as provided by the invention.

In a form of the invention hereof, electronic processing is performed to obtain low and high spatial frequency representations of an image before storage of frames in digital form. In particular, there is provided an apparatus and method for encoding and decoding a video signal, wherein the encoder includes means responsive to the video signal for deriving a representation of low spatial frequency components of the images represented by the video signal. Also derived is a representation which includes high spatial frequency components of the images represented by the video signal. Means are provided for producing output frames of the low spatial frequency component representation at a fast frame refresh rate, such as the standard NTSC frame rate of 30 frames per second. Means are also provided for producing output frames of the high spatial frequency component representation at a slow frame refresh rate, preferably in the range of 3 to 15 frames per second. A rate of about 5 frames per second is considered to be suitable for maximizing the bandwidth saving while substantially maintaining the high resolution integrity. In the decoder, means are provided for combining the low spatial frequency component representation with the high spatial frequency component representation to obtain a decoded video signal.

In a form of the invention, means are provided for delaying the output frames of low spatial frequency component representation with respect to the output frames of high spatial frequency component representation. It was determined from human visual psychophysical measurements, that the more rapidly changing low definition portions of an image tend to have a masking effect on the high resolution portions both before and after the time of the transient caused by motion. By delaying the output frames of the low spatial frequency component representation with respect to the output frames of high spatial frequency component representation (which can be thought of as effectively accelerating the high spatial frequency component represenation) the masking effect can be used to obscure, for a longer period of time, the slow presentation of detail information.

In an embodiment of the invention, the deriving of the representation of low spatial frequency components of the images represented by the video signal is implemented by low pass filtering the video signal and forming weighted sums of corresponding elements of three consecutive scanlines, centered around every other scanline of a frame. Also, in this embodiment, the means for deriving a representation which includes high spatial frequency components of the images represented by the video signal is implemented by selecting alternately the high frequency signal components of said every other scanlines, and the low and high frequency signal components of the scanlines between said every other scanlines. In this manner, averaging is achieved in the vertical direction while reducing an artifact that can result from using an unweighted sum of lines. Also, a saving in the bandwidth of the signals representative of the high frequency components of said every other scanlines is achieved by not including these signal components in the high resolution channel.

Further features and advantages of the invention will become more readily apparent from the following detailed description when taken in conjunction with the accompanying drawings.

DESCRIPTION OF THE PREFERRED EMBODIMENTS

Figure 1:
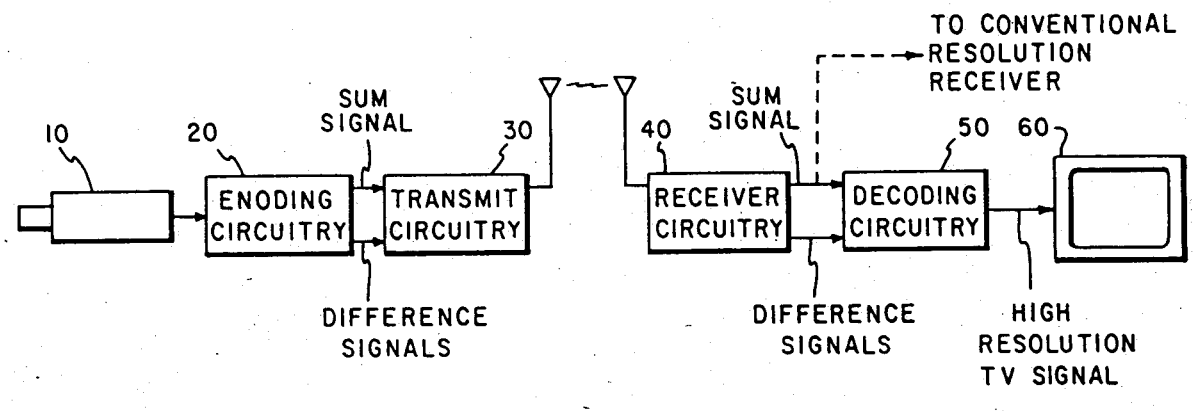
FIG. 1 is a block diagram of compatible high definition television system in accordance with an embodiment of the invention and which can be used to practice the method of the invention.

Referring to FIG. 1, there is shown a block diagram of a high definition television system in accordance with a first embodiment of the invention. A high resolution television camera 10, which is assumed for ease of explanation to be a monochrome camera, generates television video signals which are coupled to encoding circuitry 20. The encoding circuitry operates, in accordance with principles to be described, to digitize the video frames into arrays of pixels and produce a sum or "intensity" signal I, and three difference signals designated at the X, Y and Z difference signals. The I signal contains information in a frequency bandwidth that is substantially equivalent to conventional television luminance bandwidth. The encoding circuitry also produces a plurality of auxiliary signals, called "difference signals", which, when taken in conjunction with the sum signal, can later be used to obtain substantially the high resolution information contained in the original digitized frames of video. The sum signal and the difference signals are converted to analog form and coupled to transmitting circuitry 30 which may include means for modulating carriers with the sum and difference signals and transmitting the modulated carriers.

At the receiver end, receiving circuitry 40 recovers the sum and difference signals, which are in turn, coupled to decoding circuitry 50. The decoding circuitry 50, digitizes the sum and difference signals and combines them to obtain a pixel value for each pixel of an output video frame that is equivalent to the pixel value of the corresponding pixel of the original high resolution frame digitized at the encoder. The high resolution digital video signal is converted to analog form and displayed on the display 60. A feature of the invention is that the sum signal I is compatible with conventional broadcast television and can be employed by home receivers which are not equipped with the decoder circuitry necessary to obtain the higher resolution video.

Figure 2:
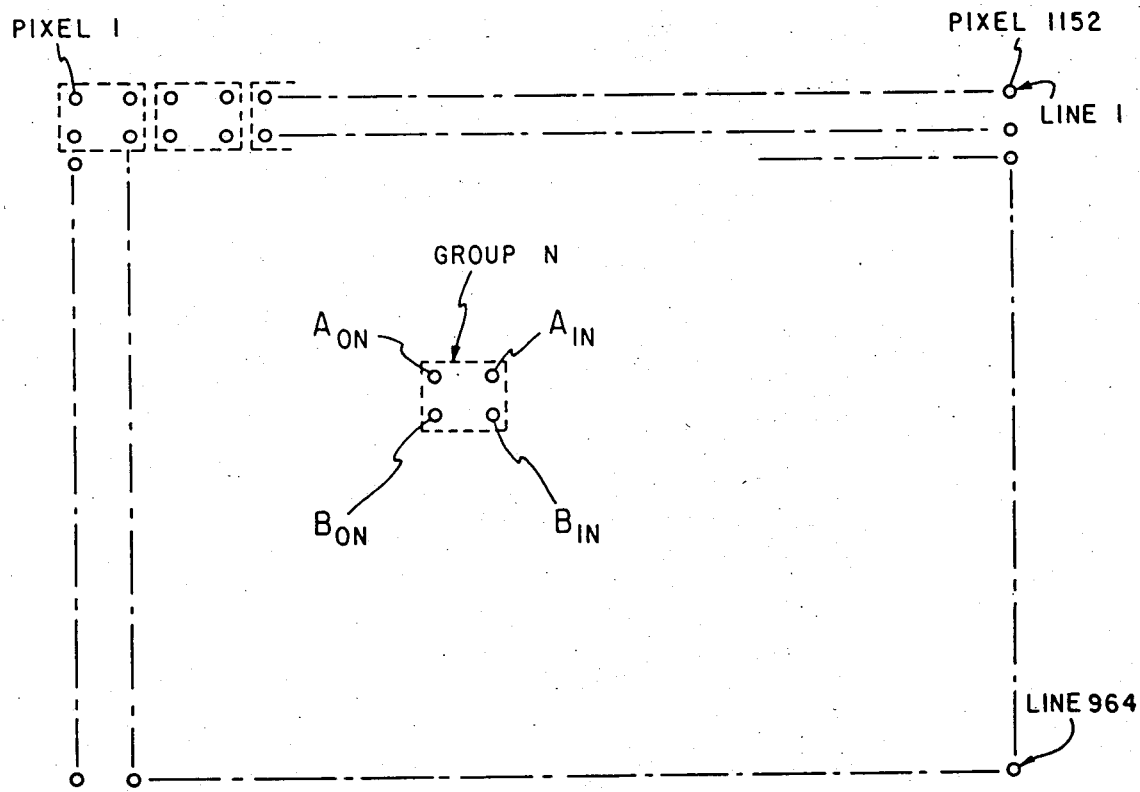
FIG. 2 illustrates scanlines and pixel groups of a high resolution digitized frame of a described embodiment.

FIG. 2 is useful in understanding the manner in which the sum (or intensity) and difference signals can be generated for an array of pixels. In the FIGURE, the pixels are represented by the small dots, there being 1152 in a line, and 964 viewable lines per frame in the present example. The pixels of FIG. 2 can be thought of as "high resolution" pixels, in that there are approximately twice as many horizontal and vertical elements or pixels per frame as compared to conventional broadcast television. The pixels of the present embodiment are divided into groups of four pixels each, as shown. Therefore, the groups can be designated horizontally as group 1 through group 576, and the lines of groups can be designated as group line 1 through group line 482. Accordingly, the number of pixel groups approximately corresponds to the number of resolution elements in conventional broadcast television. In the present embodiment, a sum or intensity signal I is formed of the four pixels in each group, this sum signal (when properly scaled) being representative of the average intensity (or luminance) level in the elemental area defined by the pixel group. If the pixels in a given group n, falling on an adjacent line pair designated as line A and line B, are designated as $A_{0n}$, $A_{1n}$, $B_{0n}$, and $B_{1n}$, as illustrated in FIG. 2, then the sum or intensity signal, $I_n$, is expressed as:

$$I_n = A_{0n} + A_{1n} + B_{0n} + B_{1n} \quad (1)$$

The difference signals of the present embodiment, expressed as $X_n$, $Y_n$ and $Z_n$, and taken by subtracting the sum of the columns, the sum of the rows, and the sum of the diagonals, respectively, are as follows:

$$X_n = (A_{0n} + B_{0n}) - (A_{1n} + B_{1n}) = A_{0n} - A_{1n} + B_{0n} - B_{1n} \quad (2)$$

$$Y_n = (A_{0n} + A_{1n}) - (B_{0n} + B_{1n}) = A_{0n} + A_{1n} - B_{0n} - B_{1n} \quad (3)$$

$$Z_n = (A_{0n} + B_{1n}) - (A_{1n} + B_{0n}) = A_{0n} - A_{1n} - B_{0n} + B_{1n} \quad (4)$$

The signs could, of course, be reversed for all difference signals. When the independent equations (1) through (4) are solved for $A_{0n}$, $B_{0n}$, $A_{1n}$ and $B_{1n}$, the following solutions are obtained:

$$A_{0n} = \frac{I_n + X_n + Y_n + Z_n}{4} \quad (5)$$

$$A_{1n} = \frac{I_n - X_n + Y_n - Z_n}{4} \quad (6)$$

$$B_{0n} = \frac{I_n + X_n - Y_n - Z_n}{4} \quad (7)$$

$$B_{1n} = \frac{I_n - X_n - Y_n + Z_n}{4} \quad (8)$$

Relationships (5) through (8) are used in the decoding circuitry at the receiver end to recover the pixel values originally stored at the encoder.

In the present illustrative embodiment of the invention, the "low resolution" intensity signal I (which will be understood hereinafter to be at substantially conventional broadcast television resolution) is generated at the conventional television video frame rate, and a full complement of difference signals is generated at one-third the conventional television video frame rate. It will be understood, however, that various rates can be employed, as described further hereinbelow. In the present embodiment the difference signals X, Y and Z are formed in sequence, one frame of a single difference signal being formed during the period of a conventional television video frame.

Figure 3:
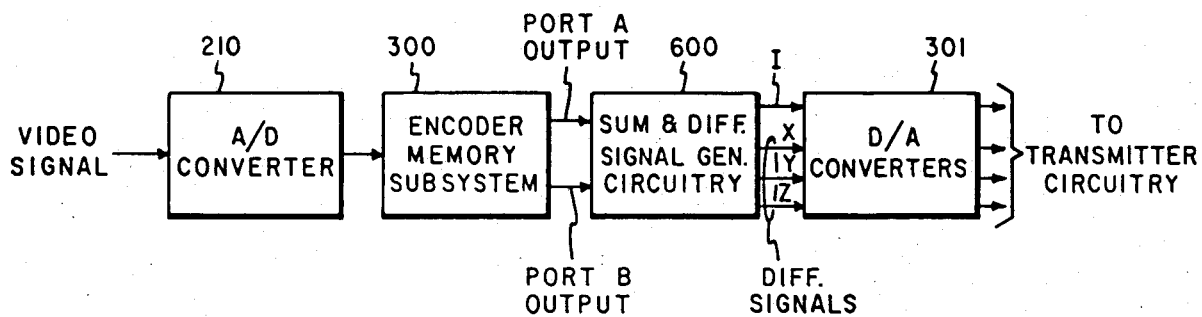
FIG. 3 is a block diagram of the encoding circuitry of FIG. 1.
Figure 4:
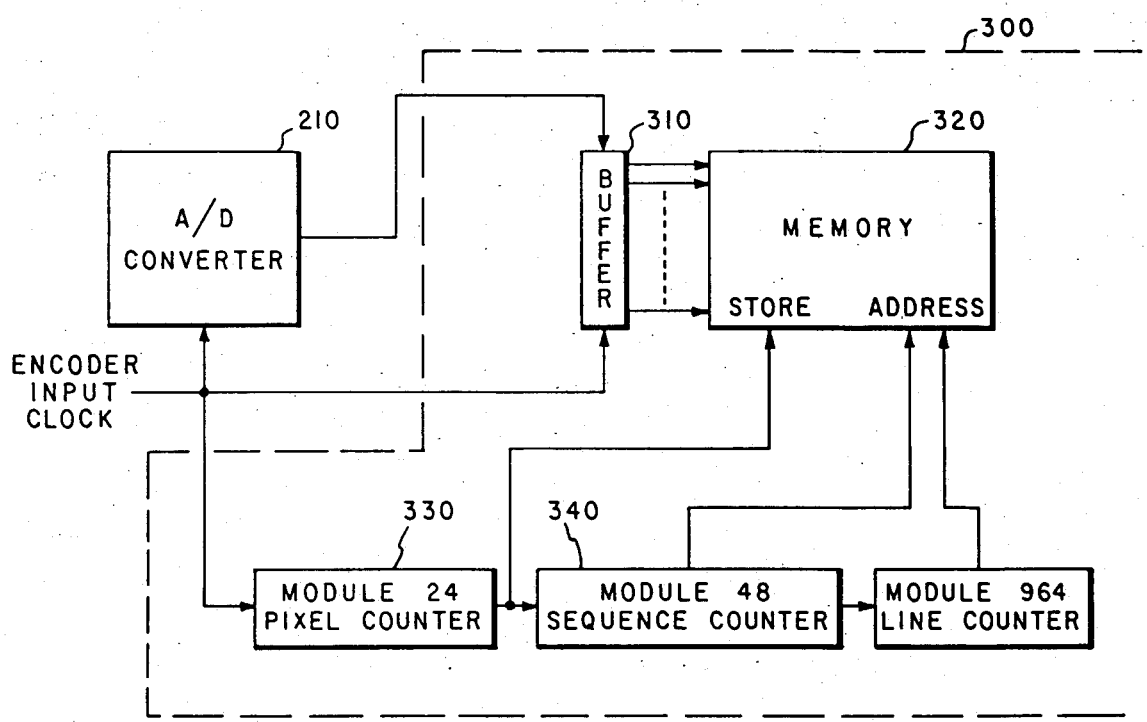
FIG. 4 is a block diagram of a portion of the encoder memory sybsystem, showing the input control and addressing thereof.
Figure 5:
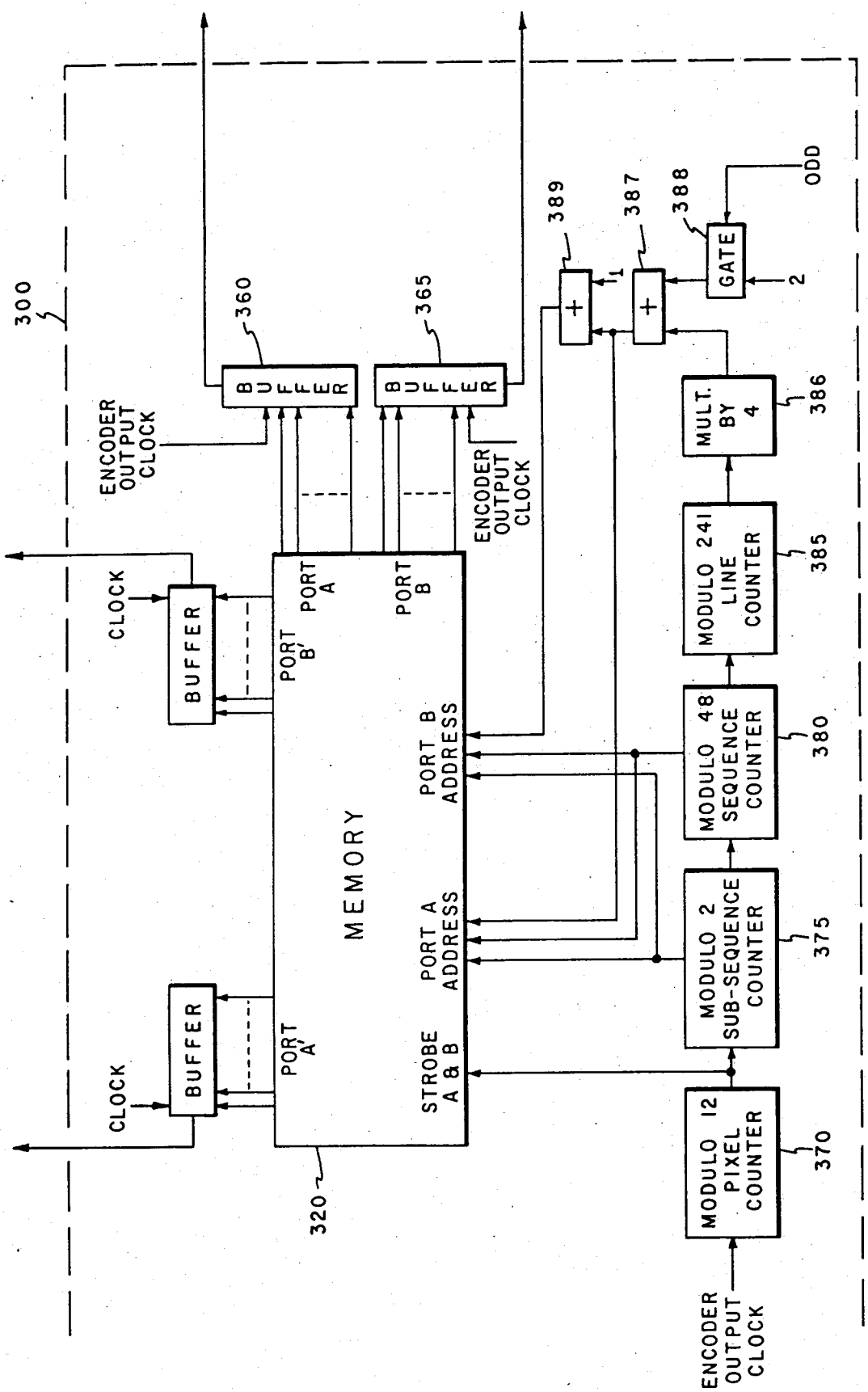
FIG. 5 is a block diagram of a portion of the encoder memory subsystem showing the output control and addressing thereof.

Referring to FIG. 3, there is shown a simplified block diagram of the encoding circuitry 20 of the first embodiment. The video signal from camera 10 (FIG. 1) is coupled to an analog-to-digital converter 210 which conventionally operates to convert the television signal to digital form. In the present embodiment, each video pixel of a frame is represented by an 8-bit binary signal that is determined by the instantaneous luminance level of the video signal at the particular pixel position. The analog-to-digital converter 210 operates to digitize each pixel at the encoder input clock rate, and couple the 8-bit pixel values to the encoder memory subsystem 300. Reference can also be made to FIGS. 4 and 5 for further detail. In particular, the output of analog-to-digital converter 210 is coupled to the input of a 24-stage serial-in-parallel-out buffer register 310, which is also clocked at the encoder input clock rate. The buffer register 310 is operative to receive twenty-four 8-bit pixel values from the analog-to-digital converter and, when full, the buffer register contents are strobed into the input port of the random access memory 320. In the present embodiment the memory 320 stores one frame of 8-bit pixels of the high resolution video. The memory 320 has a pair of output ports respectively designated as an A port and a B port. The A port is used to output the pixel values of an odd-numbered line, and the B port is used to output the pixel values of the adjacent even-numbered line. In this manner, the pixels of the groups of FIG. 2 are conveniently accessed to produce the desired sum and difference signals. To facilitate fast processing, and as will be described further hereinbelow, the sum and difference signals are formed using sum and difference signal generation digital circuitry 600 that simultaneously processes pixel values from the A and B ports. [An independent pair of ports, designated as an A' port and a B' port can be used for difference signal formation, as will be described hereinbelow.] The output of circuitry 600 is coupled to digital-to-analog converters 301, which convert the sum and difference signals to analog signals that are coupled to the transmit circuitry 30 (FIG. 1).

FIG. 4 illustrates the input control and addressing of the encoder memory subsystem 300. As previously described, pixels are clocked into the buffer register 310 at the encoder input clock rate. A modulo 24 pixel counter 330 is provided to count clock pulses and generate an output when the input buffer register 310 is loaded with the latest 24 8-bit pixel values. The output of counter 330 is applied to strobe the 24 pixel values into the memory 320 via its input port. The output of counter 330 is also coupled to a modulo 48 counter 340 that keeps track of the number of 24-pixel sequences that have been read in per line. Accordingly, the count of sequence counter 340 is a "sequence address"; i.e., a number from 0 to 47 that designates a portion of the address where the latest 24-pixel sequence is to be stored in the memory. The output of sequence counter 340 is also coupled to a modulo 964 line counter that is, accordingly, stepped at the end of each line and which thereby generates the portion of the address which designates the line of pixels being read in. In this manner, it will be understood that a composite address is generated for each sequence of 24 high resolution pixels, so that a full frame of high resolution pixels can be stored at readily retrievable locations of the memory 320.

FIG. 5 illustrates the output control and addressing of the encoder memory subsystem. As noted above, the memory has output ports, designated as port A and port B. When the port A output is operating to read out pixel values of a particular scanline, the port B is used to read out pixel values of the corresponding pixels of the next scanline. This facilitates the generation of the sum and difference signals. Output from each port, in parallel, are twelve consecutive pixel values of a scanline; i.e., one-half of a 24-pixel sequence as described in conjunction with the encoder memory input addressing and control. A port A output buffer register 360 and a port B output buffer register 365 are each 12-stage parallel-in-serial-out registers which operate under control of the encoder output clock.

A modulo 12 counter 370 counts encoder output clock pulses, and thereby generates an output that is used to strobe a sequence of 12 pixels of each of two consecutive scanlines into the parallel-in-serial-out output buffer registers 360 and 365 for port A and port B, respectively. The output of counter 370 is coupled to a modulo 2 sub-sequence counter 375 that keeps track of which half of the originally stored 24 pixel sequence is being addressed. Accordingly, the single bit output of counter 375 is a part of the address input to encoder memory output ports. The counter 375 output is coupled to a modulo 48 sequence counter 380, whose output count is another portion of the address; i.e., the designation of the particular 24-pixel sequence being addressed at both ports. The output of counter 380 is coupled to a modulo 241 line counter 385 whose output is coupled to a multiply-by-four circuit 386. The output of multiplier 386 is coupled to one input of adder 387. The other input to adder 387 is the output of gate 388. The gate 388 has an input representative of the number 2, and is enabled during generation of an odd television field. The output of adder 387 is the line number portion of the port A address, and it is also coupled to another adder 389 which adds 1. The output of adder 389 is the line number portion of the port B address. In operation, the line addressing circuitry just described operates such that the port A line addresses designate the odd lines and the port B addresses designate the even lines. During an even field, the line pairs 0,1 then 4,5 then 8,9

... are addressed, and during the odd field the lines 2,3 then 6,7 then 10,11 ... are addressed at the two ports. In this manner, an interlaced output is obtained by interrogating alternating pairs of lines of the high resolution array. Thus it is seen that the complete addresses at ports A and B provide consecutively the pixels from successive line pairs of the stored video frame, the pixel values being strobed, 12 bits at a time, into the output buffers 360 and 365.

Figure 6:
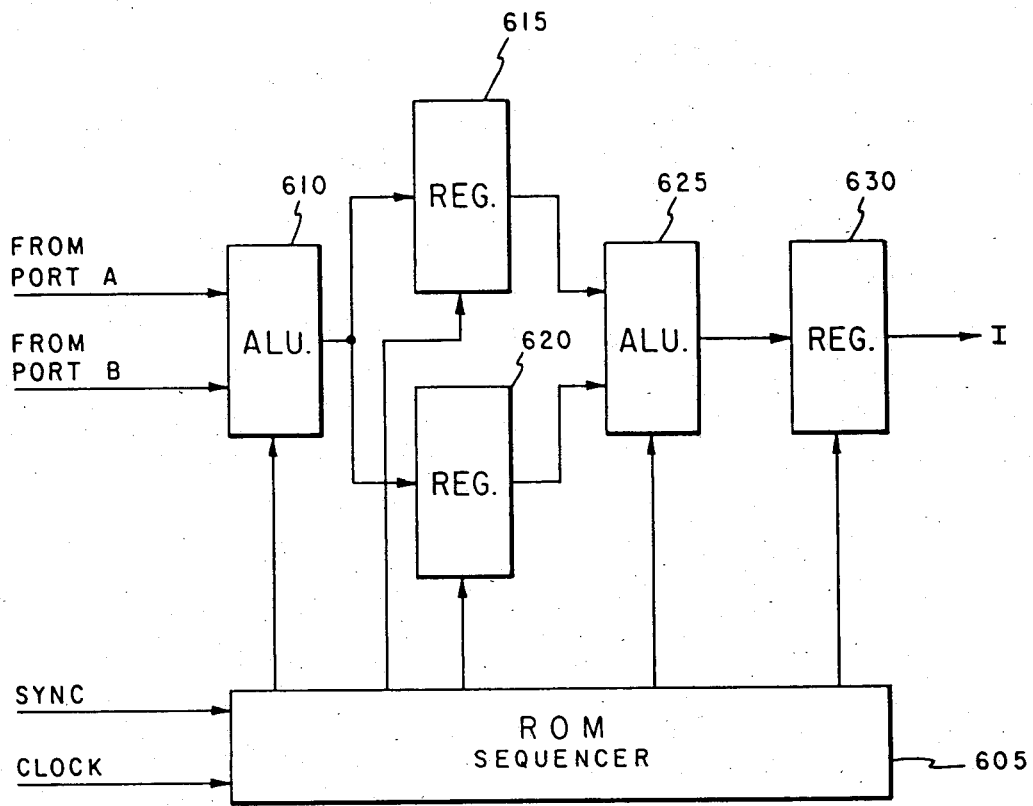
FIG. 6 is a block diagram of the sum signal generation portion of the sum and difference signal generation circuitry of the encoder.

FIG. 6 illustrates the portion of the sum and difference signal generation circuitry 600 used for generating the intensity signal I from the port A and port B outputs as they are clocked serially out of the buffer registers 360 and 365, respectively. The circuitry includes arithmetic logic units 610 and 625, and storage registers 615, 620, and 630. The arithmetic logic unit 610 receives the port A and port B outputs. The output of arithmetic logic unit 610 is coupled to storage registers 615 and 620 whose outputs are, in turn, coupled to the arithmetic logic unit 625. The output of arithmetic logic unit 625 is, in turn, coupled to storage register 630, whose output is the desired sum signal, I, in accordance with the relationship (1) above.

Figure 7:
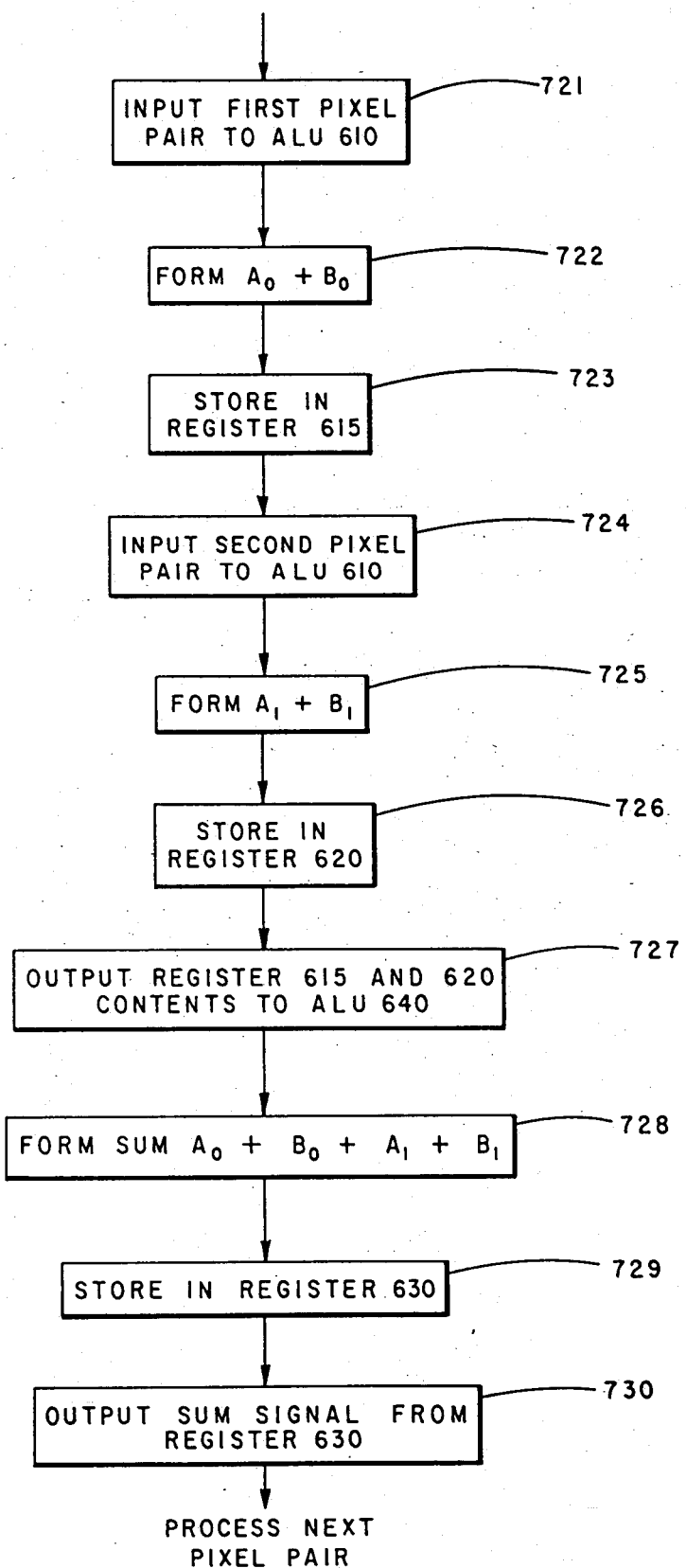
FIG. 7 is a flow diagram for controlling the ROM sequencer of the sum signal generation circuitry of the encoder.

The described arithmetic logic units and storage registers are under control of ROM sequencer 605 which receives the vertical and horizontal synchronizing signals and the encoder output clock signal and generates the control sequence illustrated by the flow diagram of FIG. 7 to obtain the sum set forth in relationships (1). In particular, the first pixel pair from port A and port B is input to the arithmetic logic unit 610, as represented by the block 721. The arithmetic logic unit 610 is controlled to form the sum of this first pixel pair; i.e., to form $(A_0+B_0)$ as illustrated in the group of FIG. 2, and as represented by the block 722. The output of arithmetic logic unit 610 is stored in register 615 (block 723). The second pixel pair of the group is then input to arithmetic logic unit 610 (block 724) which is again controlled to form an addition function (block 725). The result is stored in register 610 (block 726). The outputs of registers 615 and 620 are output to arithmetic logic unit 625 (block 727) which is controlled to form a sum (block 728) in accordance with relationship (1) above. The output of arithmetic logic unit 625 is stored in register 630 (block 729) and output from register 630 (block 730) to serve as the sum signal output I that is coupled to transmit circuitry 30 (e.g FIG. 1).

Figure 8:
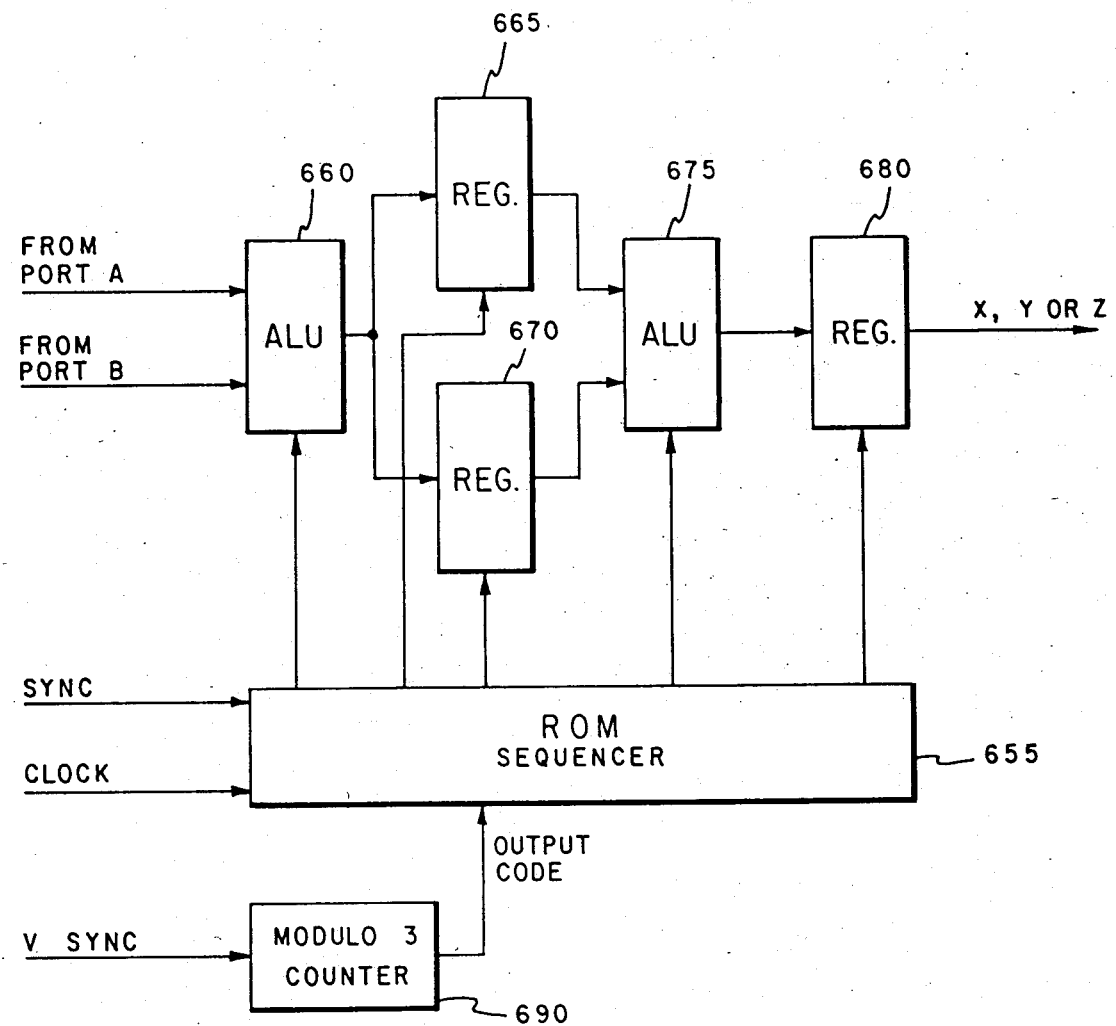
FIG. 8 is a block diagram of the difference signal generation portion of the sum and difference signal generation circuitry of the encoder.

FIG. 8 illustrates the portion of the sum and difference signal generation circuitry 600 (FIG. 3) used for generating the difference signals X, Y and Z from the port A and port B outputs as they are clocked serially out of the buffer registers 360 and 365, respectively. The circuitry includes arithmetic logic units 660 and 675, and storage registers 665, 670 and 680. The arithmetic logic unit 660 receives the port A and port B pixel streams. The output of arithmetic logic unit 660 is coupled to storage registers 665 and 670, whose outputs are, in turn, coupled to the arithmetic logic unit 675. The output of arithmetic logic unit 675 is, in turn, coupled to storage register 680, whose output is, depending upon time, either the X, Y, or Z difference signal in accordance with relationships (2), (3) or (4) above. The described arithmetic logic units and storage registers are under control of ROM sequencer 655, which receives the vertical and horizontal synchronizing signals and the encoder output clock signal, and generates the control sequence illustrated by the flow diagram of FIG. 9 to obtain the desired difference signals. A modulo 3 counter 690 is responsive to alternate vertical synchronizing signals to produce one of three output counts that serve as the code to determine which of the X, Y or Z difference signals is to be generated for a particular frame. This output code is also coupled to the transmit circuitry 30 so that it can be transmitted and used in the decoder circuitry of the receiver in order to distinguish between the difference signals at the decoder.

Figure 9:
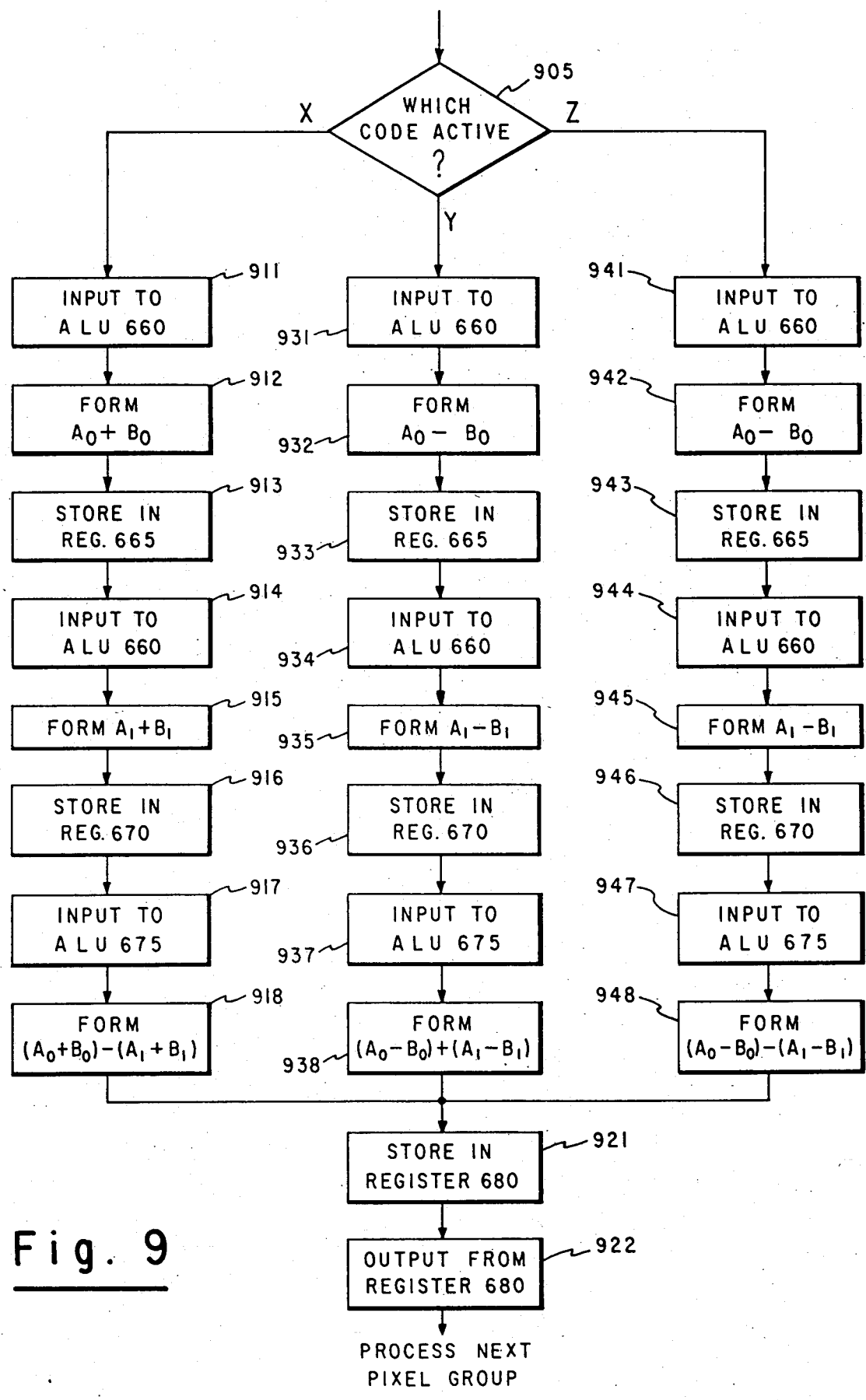
FIG. 9 is a flow diagram for controlling the ROM sequencer of the difference signal generation circuitry of the encoder.

In FIG. 9, decision diamond 905 represents determination of which difference signal code, X, Y or Z, is active. If the X code is active, the block 911 is entered, this block representing the inputting of the first pixel pair from port A and port B to the arithmetic logic unit 660. The arithmetic logic unit 660 is controlled to form the sum of this pixel pair, as represented by the block 912. The output of arithmetic logic unit 660 is stored in register 665 (block 913). The second pixel pair of the group is then input to arithmetic logic unit 660 (block 914), which is again controlled to form an addition function (block 915). The result is stored in register 670 (block 916). The output of registers 665 and 670 are coupled to arithmetic logic unit 675 (block 917) which is controlled to form a difference (block 918). The output of arithmetic logic unit 675 is stored in register 680 (block 921), and output from register 680 (block 922) as the difference signal X that is coupled to transmitter circuitry 30. The process is then repeated for the two pixel pairs of the next group, and the procedure is continued for each scanline pair of the frame. In this manner, it is seen that the X difference signal is formed in accordance with the relationship (2) above.

During the next frame, when the Y code is active, the branch beginning with block 931 is operative. In particular, the first pixel pair is input to the arithmetic logic unit 660 (block 931) which is controlled to form the difference of this pixel pair, i.e. $(A_0-B_0)$ as represented by block 932. The output of arithmetic logic unit 660 is stored in register 665 (block 934). The second pixel pair of the group is then input to arithmetic logic unit 660 (block 934) which is again controlled to perform a subtraction (block 935). The result is stored in register 670 (block 936). The output of registers 665 and 670 are output to arithmetic logic unit 675 which is controlled to form a sum (block 938). Blocks 921 and 922 function, as before, to control the storage in register 680 and the output from register 680 of the Y difference signal, consistent with the relationship set forth above in equation (3).

During the next frame, when the Z code is active, the branch beginning with block 941 is operative. The first pixel pair is input to the arithmetic logic unit 660 (block 941) which is controlled to form the difference of this pixel pair, i.e. $(A_0-B_0)$ as represented by block 942. The output of arithmetic logic unit 660 is stored in register 665 (block 943). The second pixel pair of the group is then input to arithmetic logic unit 660 (block 944) which is again controlled to perform a subtraction (block 945). The result is stored in register 670 (block 946). The output of registers 665 and 670 are output to arithmetic logic unit 675 which is controlled to perform a subtraction (block 948). Blocks 921 and 922 function, as before, to control the storage in register 680 and the output from register 680 of the Z difference signal, consistent with the relationship set forth above in equation (4).

Figure 10:
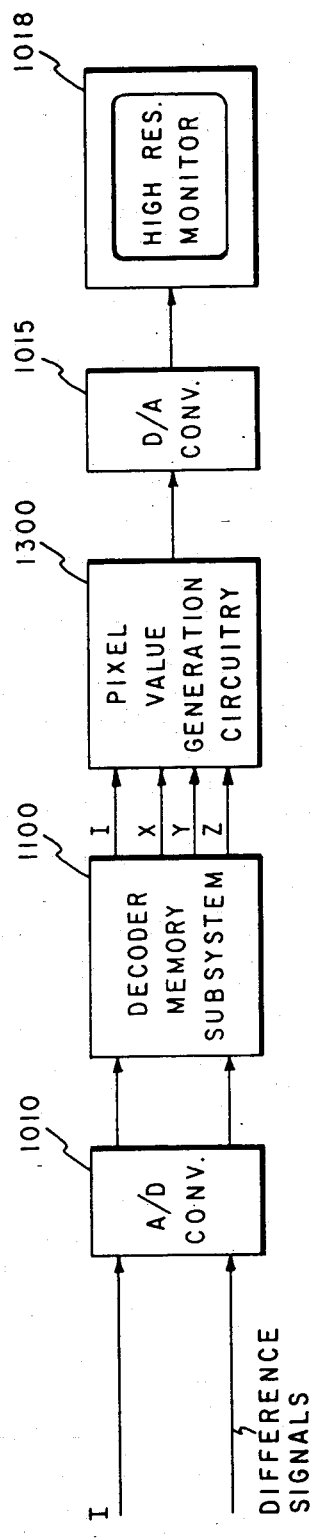
FIG. 10 is a block diagram of the decoding circuitry of FIG. 1.

Referring to FIG. 10, there is shown a simplified block diagram of the decoding circuitry 50 (FIG. 1). The sum and difference signals recovered by receiver circuity 40 (FIG. 1) are coupled to analog-to-digital converters 1010 which operate to convert the sum and difference signals to digital form. The digitized signals are coupled to the decoder memory subsystem 1100 which is operative in the present embodiment to produce simultaneously, at four output ports, the latest digital information representative of the sum signal (I) and the three difference signals (X, Y and Z). These signals are combined by pixel value generation circuitry 1300, in accordance with the relationships (5), (6), (7) and (8), to recover the high resolution pixel values originally stored at the encoder. The output of circuitry 1300 is coupled to digital-to-analog converter 1015 which converts the digital signal output from circuitry 1300 into analog form suitable for display on high resolution monitor 1018.

Figure 11:
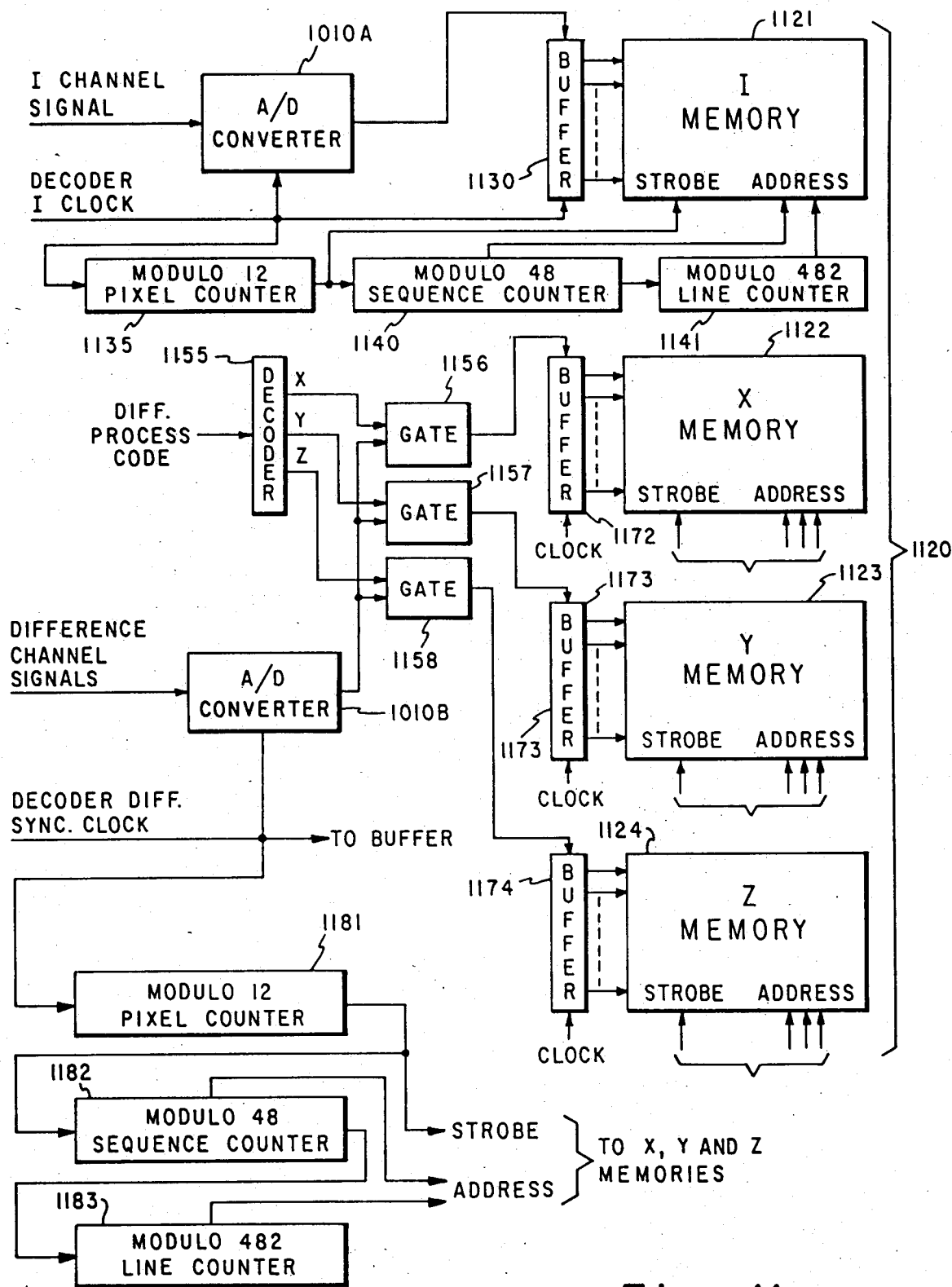
FIG. 11 is a block diagram of a portion of the decoder memory subsystem, showing the input control and addressing thereof.

FIG. 11 illustrates the input control and addressing of the decoder memory subsystem 1100. The memory portion thereof is organized in the present embodiment as four two-port memory blocks of random access memory, each capable of storing 576 (12×48) 8-bit pixel values per line, by 482 lines. The four portions of the decoder memory are called the intensity memory 1121, the X difference signal memory 1122, Y difference signal memory 1123, and the Z difference signal memory 1124. These portions of the memory are operative to respectively store, via their input ports, the signals designated I, X, Y and Z, these signals then being read out at the respective output ports of the memory portions and combined in a manner to be described.

The intensity channel signal I is received by analog-to-digital converter 1010a which converts the analog signal to 8-bit digital pixel values at a decoder intensity channel clock rate that is typically the same as the encoder output clock rate. An input buffer register 1130 is a serial-in-parallel-out register that receives twelve 8-bit pixel values which are strobed in parallel into the memory 1121. A modulo 12 counter 1135 counts the clock pulses and produces a strobe signal that is operative to strobe twelve pixels of information from the buffer 1130 into the memory 1121. The output of modulo 12 counter 1135 is counted by a modulo 48 counter 1140, the count of which comprises the sequence address portion of the address coupled to memory 1121. The output of modulo 48 counter 1140 is coupled to a modulo 482 counter 1141 whose count constitutes the line address input to memory 1121. Accordingly, each group of twelve 8-bit pixels is strobed into an appropriate sequence address and line address in the decoder intensity memory 1121.

The difference channel signal is coupled to an analog-to-digital converter 1010b which converts the difference channel signal to 8-bit pixel values at a decoder difference channel clock rate that may be the same or different than the decoder intensity channel clock rate. The difference channel signal is also coupled to a decoder 1155 which detects the difference process code (X, Y or Z), as previously described, to determine which of the X, Y or Z difference signals is active during the present frame. The output of decoder 1155 couples an enabling signal to one of three gates; i.e., an X gate 1156, a Y gate 1157 or a Z gate 1158, depending upon which difference signal is active. The decoded signal is also coupled to the X, Y and Z memories as an address select indication. The 8-bit pixel value output from the analog-to-digital converter 1010b is coupled through the enabled gate 1156, 1157, or 1158 to the input of serial-in-parallel-out buffer register 1172, 1173, or 1174.

The input address generation for the X, Y, and Z portions of the decoder memory 1122, 1123 and 1124 is similar to the address generation for the intensity memory section 1121. (If the input clocks are selected as being the same, the input address generation for the X, Y and Z memory sections may be in common with the input address generation for the intensity memory section.) The clock signal is coupled to a modulo 12 counter 1181 whose output is the strobe signal used to strobe the contents of buffers 1172, 1173, or 1174 into their respective memories. However, only the one memory whose memory portion select address line is active will identify an address into which the pixel values are strobed. The output of modulo 12 counter 1181 is coupled to a modulo 48 counter 1182 whose count constitutes the sequence address for the sequence of twelve pixels being strobed in, as described above. Also, the output of the modulo 48 counter 1182 is coupled to a modulo 482 counter 1183 whose output, again, serves as a line address. The strobe and address signals are coupled to each of the memories 1121, 1122 and 1123, along with the memory portion select address. Accordingly, it is seen that the decoder memory continuously stores the intensity channel signal in the decoder memory section 1121 and sequentially stores frames of the X difference signal, the Y difference signal and the Z difference signal in the memory sections 1122, 1123 and 1124, with each of the difference signal memories being updated at a slower information rate; i.e., once every three video frames in the present exemplary embodiment.

Figure 12:
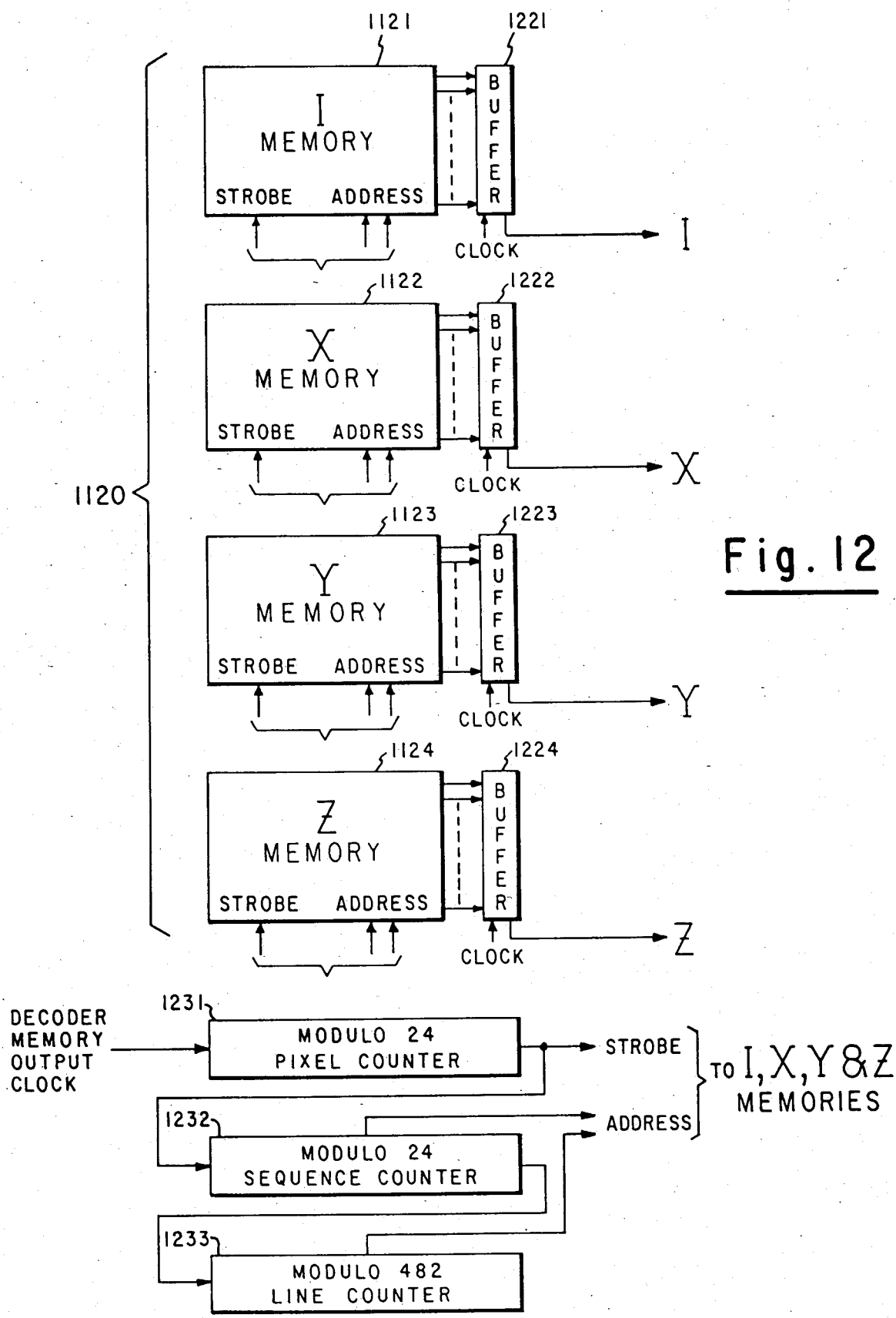
FIG. 12 is a block diagram of a portion of the decoder memory subsystem, showing the output control and addressing threof.

Referring to FIG. 12, there is shown the receiver memory output ports and output addressing. The memory portions 1121, 1122, 1123, and 1124 each have 24-pixel parallel outputs that are respectively coupled to parallel-in-serial-out buffer registers 1221, 1222, 1223, and 1224, whose serial outputs are 8-bit digital signals respectively representative of the intensity channel signal I and the three difference channel signals, X, Y and Z.

A modulo 24 counter 1231 counts decoder memory output clock pulses, which are at a higher rate (for example, twice the rate in this embodiment) than the decoder memory input clocks. The output of the modulo 24 counter 1231 is used as a strobe signal to strobe the 24 pixels in parallel from the memories 1121, 1122, 1123, and 1124 into their respective output buffer registers 1221, 1222, 1223, and 1224. The output of the modulo 24 counter 1231 is also coupled to the input of the modulo 24 counter 1232 whose count is utilized as the sequence address to the four memories 1121, 1122, 1123 and 1124. The output of modulo 24 counter 1232 is coupled to a modulo 482 counter 1233 whose count is utilized as a line address to the memories 1121, 1122, 1123 and 1124. Accordingly, during each frame period, the memories 1121, 1122, 1123 and 1124 output, from their respective buffers, the latest stored frames of I, X, Y and Z information. As described, the I information is "updated" every frame, and the X, Y and Z difference signal information is "updated" every three frames, so the outputs X, Y and Z are each read out three times redundantly before "new" information is read out.

Figure 13:
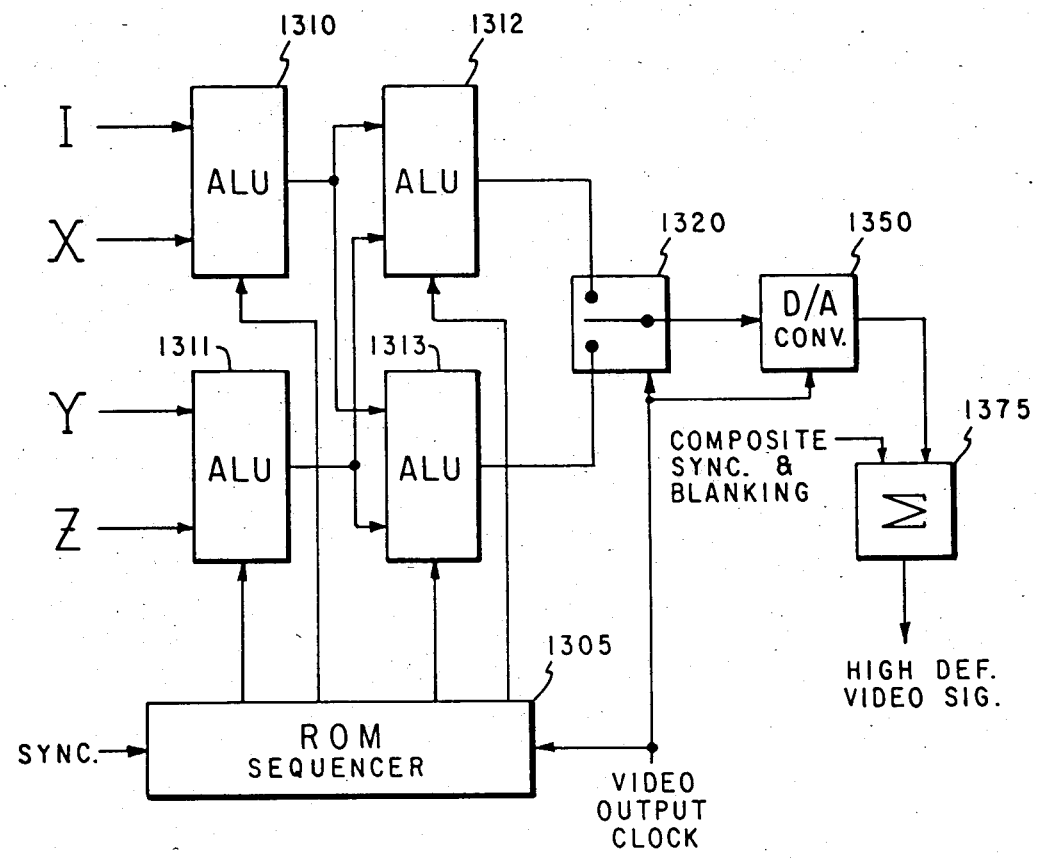
FIG. 13 is a block diagram of the pixel value generation circuitry of the decoder.

Referring to FIG. 13, there is shown a block diagram of the pixel value generation circuitry 1300 (FIG. 10) of the decoder which operates on the outputs of the decoder memory subsystem to reproduce the original pixel values in accordance with relationships (1) through (4) above. Four arithmetic logic units 1310, 1311, 1312 and 1313 are employed, under control of ROM sequencer 1305. The arithmetic logic unit 1310 receives the sum signal I and one of the difference signals X, and the arithmetic logic unit 1311 receives the difference signals Y and Z. The output of arithmetic logic unit 1310 is coupled to an input of each of the arithmetic logic units 1312 and 1313, and the output of arithmetic logic unit 1311 is coupled to the other input of each of the arithmetic logic units 1312 and 1313. The outputs of the arithmetic logic units 1312 and 1313 are respectively coupled to two inputs of solid state switch 1320, the output of switch 1320 being coupled to the input of digital-to-analog converter 1350. The output of converter 1350 is coupled to a summing circuit 1375 which also receives locally generated composite sync and blanking (which, as previously noted, is synchronized with the received television signal) to produce a composite output high definition television signal. The switch 1320 and the digital-to-analog converter 1350 operate at the decoder video output clock rate which is typically the same clock rate as the encoder input clock rate that was used to originally clock in the high resolution pixel information. ROM sequencer 1305, which receives sync and the video output clock, controls the status of the arithmetic logic units.

Figure 14:
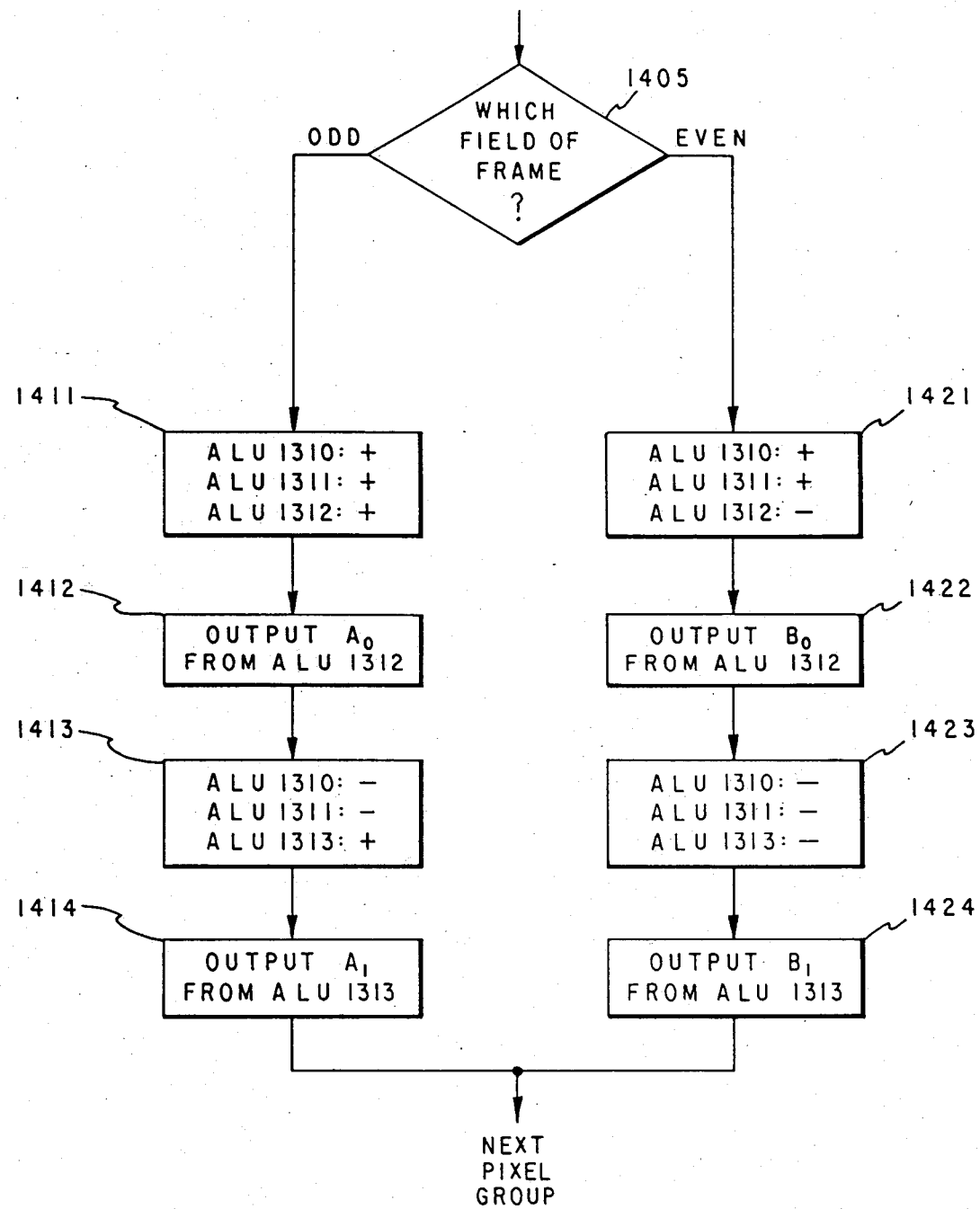
FIG. 14 is a flow diagram for controlling the ROM sequencer of the decoder pixel value generation circuitry.

FIG. 14 illustrates the routine of the ROM sequencer 1305. Decision diamond 1405 represents an inquiry as to which field of a frame is being generated, the field information being available to the ROM sequencer from the sync and blanking circuitry of the receiver. If it is the first field of the frame (an odd field), and odd output lines are to be generated, it will be understood that pixels $A_0$ and $A_1$ of each pixel group are to be generated (see FIG. 2). Pixel $A_0$ is generated in accordance with relationships (5). The block 1411 represents the control of the arithmetic logic units 1310, 1311 and 1312 to each perform an addition function, so that the output of arithmetic logic unit 1312 represents $A_0$ in accordance with relationship (5) (block 1412). The solid state switch 1320, which is clocked at the same rate as the ROM sequencer by the decoder video output clock, is synchronized to sample the output of the arithmetic logic unit 1312 for pixel $A_0$ of each group and to sample the output of the arithmetic logic unit 1313 for pixel $A_1$ of each group. To process the next pixel, upon occurrence of the next clock pulse, the arithmetic logic units 1310 and 1311 are controlled to perform a subtraction, and the arithmetic logic unit 1313 is controlled to perform an addition (block 1413), so that the output of the arithmetic logic unit (block 1414) is consistent with the desired expression for $A_1$ in accordance with relationship (6). This signal is output from arithmetic logic unit 1313 as the solid state switch 1320 samples the output of arithmetic logic unit 1313. The adjacent pixel pairs of each odd line continue to be processed in this way. When the second (even) field of the frame is being generated, the outputs of arithmetic logic units 1312 and 1313, in similar synchronism with operation of the solid state switch 1320, are used to generate signals for $B_0$ and $B_1$ respectively, consistent with relationships (7) and (8).

In particular, for the pixel $B_0$, the arithmetic logic units 1310 and 1311 are controlled to perform an addition, and the arithmetic logic unit 1312 is controlled to perform a subtraction (block 1421), so that the output $B_0$ pixel from arithmetic logic unit 1312 (block 1422) is in accordance with the expression (7). As described above, this pixel value is output to the solid state switch 1320 in synchronism with the switch sampling the output from arithmetic logic unit 1312. When the solid state switch is receiving the output of arithmetic logic unit 1312, the arithmetic logic units 1310, 1311, and 1313 are all controlled to perform a subtraction (block 1423), consistent with the relationship (8), so that the appropriate value for the pixel $B_1$ of the group can be output (block 1424).

In the described exemplary embodiment, the encoder generates a full complement of difference signals at one-third the rate at which the low resolution intensity (sum) signal is generated. Since different individual ones of the difference signals are generated concurrently with the intensity signal, the signals from the output ports A and B (FIG. 5) can be utilized to generate both the sum and the difference signals (using the combining circuitry of FIGS. 6 and 8). However, it may be preferable to save additional bandwidth by further slowing down the rate of generation of the difference signals to the full extent allowed by visual perception considerations, as described further hereinbelow. In FIG. 5, the ports designated A' and B', and their associated clocks, allow independent generation of the difference signals at any desired rate.

Also, in the described first embodiment hereof, the decoder is implemented using memories which store the incoming intensity (sum) and difference signals, and then read out the stored signals (redundantly, at least in the case of the difference signals) to combining circuitry which generates the high resolution pixel values. It is important to note, however, that the decoder could alternatively be implemented by combining previously stored high resolution pixel values (i.e., from a previous frame) with the sum and difference signals as they are received.

The exemplary first embodiment hereof has been described in terms of a monochrome system, but principles of the invention apply to color systems, as well, as disclosed further hereinbelow. For a broadcast television application, color can be encoded on the 525 line carrier in the usual way. For high definition reception a higher resolution chroma signal is used. For example, quadrature chroma coordinates can be transmitted at 525 line resolution both horizontally and vertically. The information need not be generated (or transmitted) at 30 frames per second, lower chromaticity frame rates being preferred to save bandwidth, as will be further described. Difference signals containing the high resolution chromaticity information can be employed and sent frame sequentially.

As noted above, various pixel group configurations, which may be square, rectangular, linear, or irregular, can be used, consistent with the principles of the present invention. The number of difference signals necessary in each case will be a function of the number of pixels in a group.

Before describing a further embodiment of the invention, psychophysical measurements conducted by applicant, and upon which certain aspects of the invention are based, will be reviewed. The threshold of contrast sensitivity for monochrome luminance gratings and isoluminance chromaticity gratings were measured at a number of temporal frequencies over the spatial frequency range of importance in television at normal viewing distances. This provided a series of modulation transfer functions of the eye at these spatial and temporal frequencies. The measurements provide some of the information required in determining the time constants of the eye to both luminance and chrominance - and also can be used in re-evaluation of the desired proportions in resolution required for luminance and the primary color difference signals.

Figure 15:
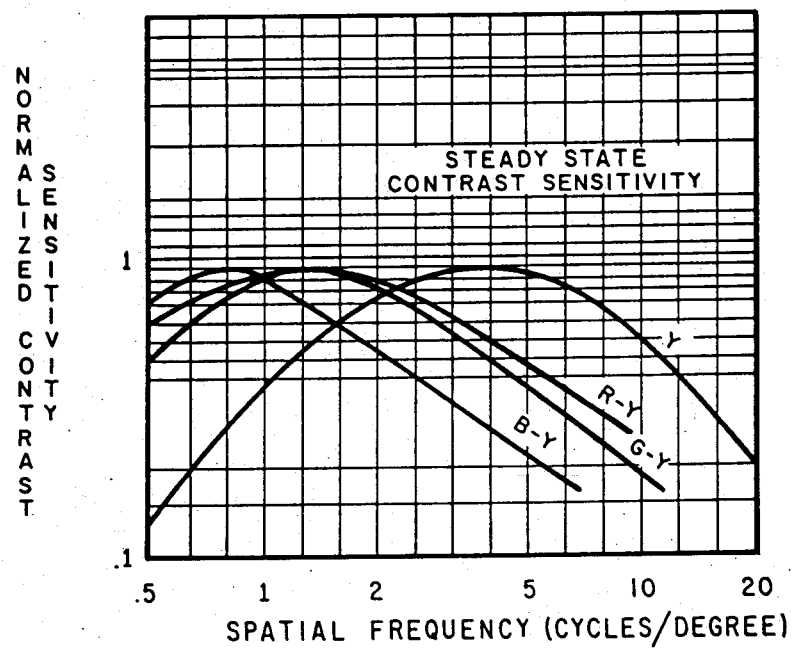
FIG. 15 shows steady state contrast sensitivity curves of the eye.

An abridged version of the steady state contrast sensitivity curves of the eye is shown in FIG. 15. This figure shows response of the eye for luminance and for isoluminance complementary color pairs on lines on the CIE diagram which go through luminance C white and the three NTSC primary colors. The color curves have been normalized so that the peak sensitivity of all four curves is equal. This normalization makes the minimum perceptible color difference equal in contrast to the minimum perceptible luminance contrast for all three primaries at low spatial frequencies. The curves are terminated at the spatial frequency at which color is no longer perceived. Gratings above this spatial frequency are still visible but appear to be monochrome at all color contrasts. From these curves and termination points, it is evident that the color difference signals should be about half the luminance resolution for R-Y and one-quarter that resolution for B-Y so considering horizontal and vertical directions, this translates to one-quarter and one-sixteenth, respectively of the luminance bandwidth.

Figure 16:
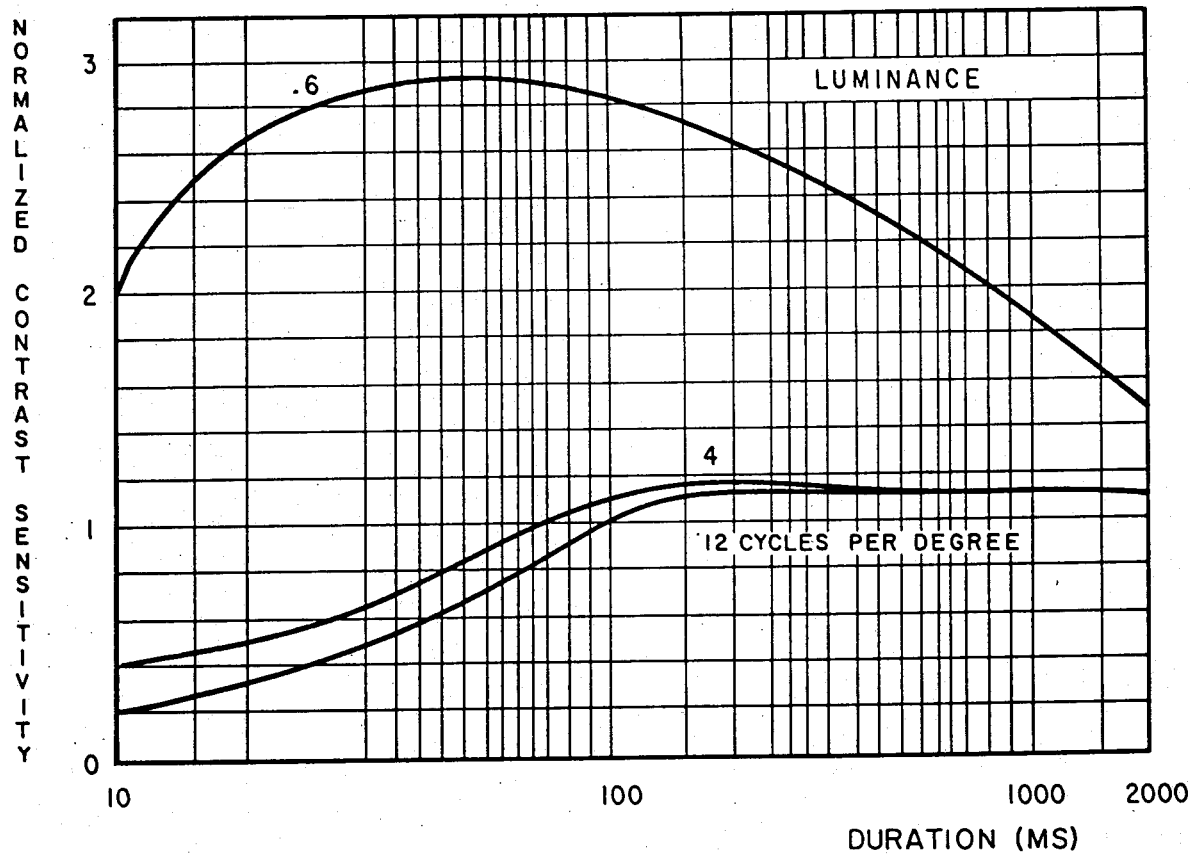
FIG. 16 shows relative sensitivity of the eye to luminosity gratings as a function of the duration of presentation of the grating.
Figure 17:
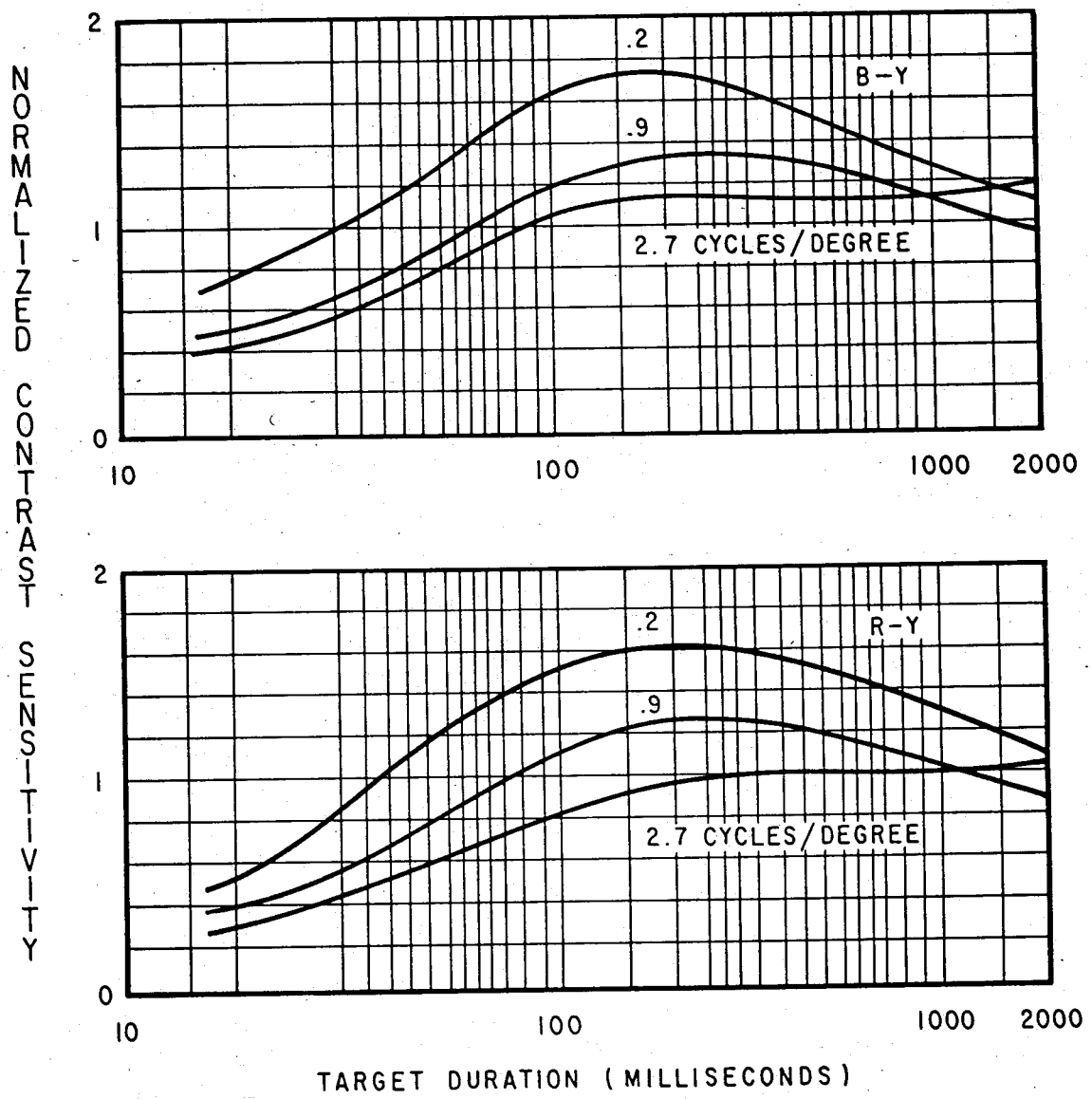
FIG. 17 shows curves for isoluminance chromaticity gratings as a function of duration.

A second series of measurements were made to determine the perception of spatial frequencies as a function of duration. Durations were used that were 1, 2, 4, 8, 16, 32, 64 and 128 fields (17 milliseconds per field.) FIG. 16 shows the relative sensitivity of the eye to luminosity gratings as a function of the duration of presentation of the grating. This is shown at 0.6, 4 and 12 cycles per degree. At low spatial frequencies in both luminance and chrominance, the eye adapts in time to the grating, making it appear less visible. For short duration presentations at about 0.1 second, these spatial frequencies are greatly enhanced in visibility compared with the steady state visibility of the grating. For very short presentations, all spatial frequencies are suppressed. FIG. 17 shows the corresponding curves for isoluminance chromaticity gratings as a function of duration at 0.2, 0.9 and 2.7 cycles per degree.

In the presence of motion there is generally a low spatial frequency brightness change which suppresses reception for a period of time. The suppression of the grating (target) actually precedes the mask for a short time. The target was presented before the mask (backward masking) as well as after the mask (forward masking). The degree of suppression by a 0.1 second mask was measured using off-the-air television as signal during the mask. The spatial frequencies (target grating) were presented for various intervals either immediately preceding or immediately succeeding the mask.

Figure 18:
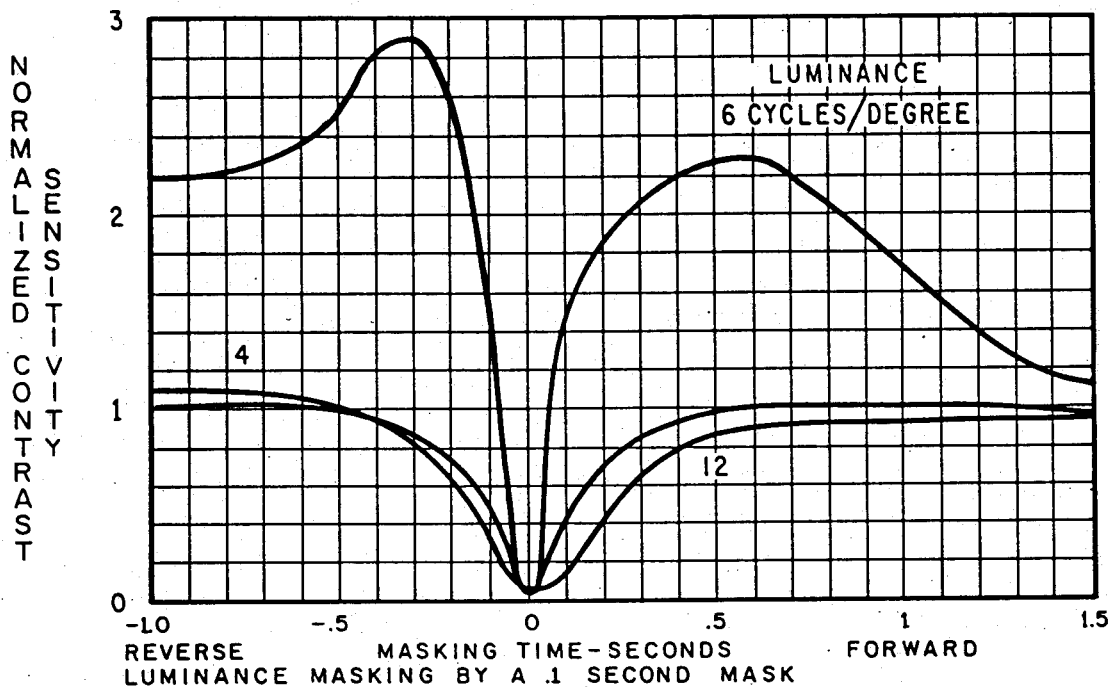
FIG. 18 shows a plot of the relative response of the eye to masking.

FIG. 18 shows a plot of the relative response of the eye to these stimuli as the grating duration was changed either immediately preceding or succeeding the mask. This experiment combines the effects of duration (FIGS. 16 and 17) and masking. It represents what would happen to the sensitivity of the eye in detail information in the scene that was just uncovered by a moving object in the image.

Figure 19:
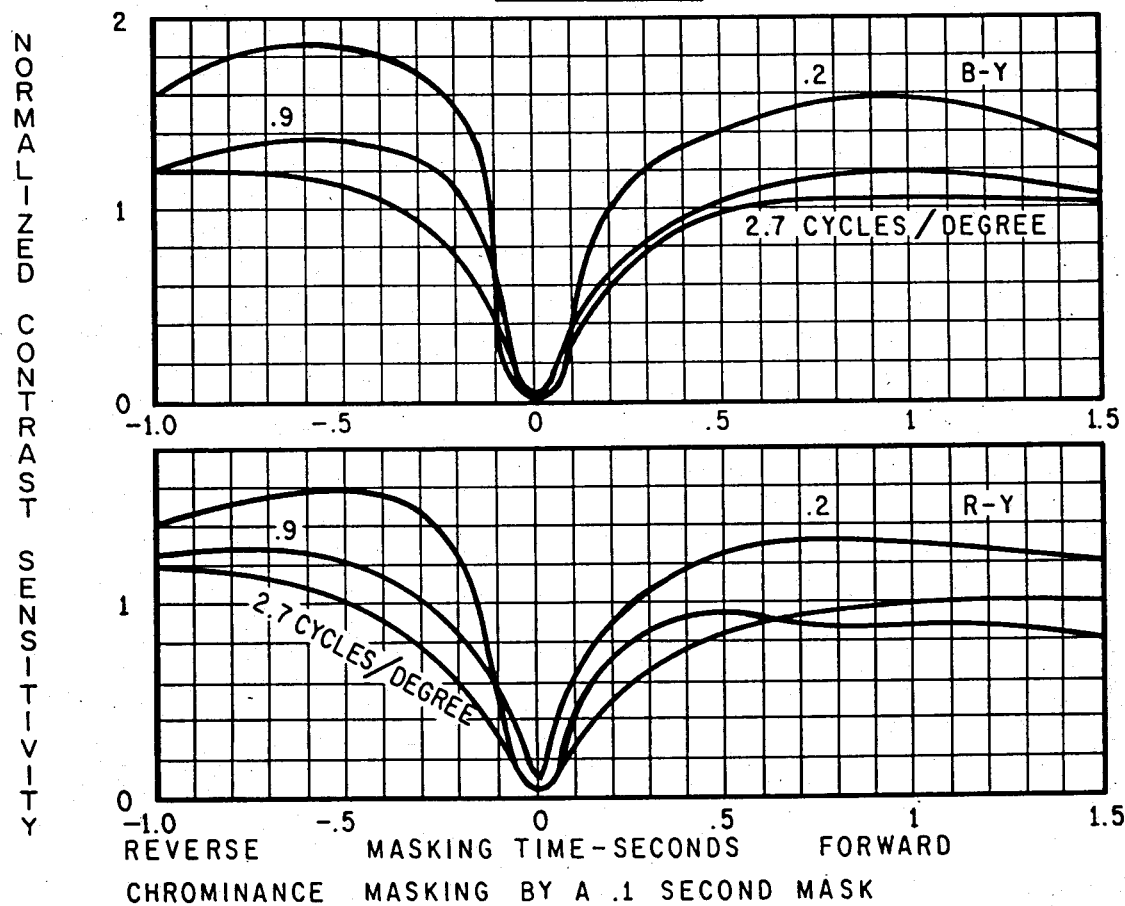
FIG. 19 illustrates relative response to masking for isoluminance chromaticity gratings.

FIG. 19 shows the corresponding curve to FIG. 18 for isoluminance chromaticity gratings. As one can see, the suppression is significant in excess of 200 millisecond period above 4 cycles per degree in luminance and above 0.9 cycle per degree in chrominance. The masking is primarily forward masking for both luminance and chrominance. The suppression of low spatial frequency luminance information in the target occurs only for about 50 milliseconds before or after the mask. From this one would conclude that a frame rate of about 20 frames per second is necessary to depict motion at low spatial frequencies, as is known in motion picture technology.

In a further form of the invention, electronic processing is performed to obtain low and high spatial frequency component representations of an image before storage of frames in digital form. The low spatial frequency representations can be used for the compatible standard resolution transmission.

Figure 20:
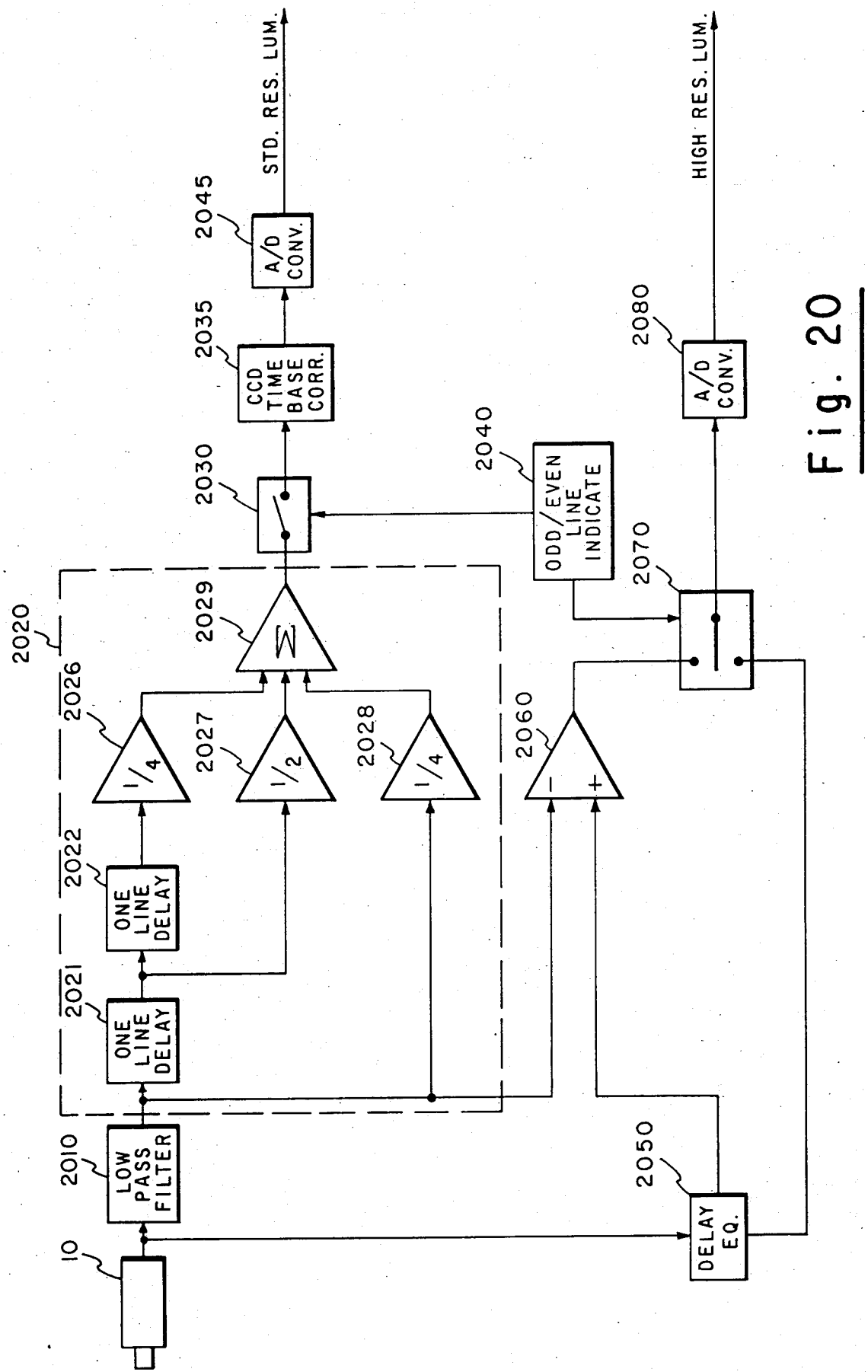
FIG. 20 is a block diagram of the luminance processor portion of encoding circuitry in accordance with an embodiment of a further form of the invention.

Referring to FIG. 20, there is shown a block diagram of the luminance processor portion of an encoding circuitry (20) embodiment in accordance with the further form of the invention. The high resolution video signal from camera 10 is coupled to a low pass filter 2010 whose output, which is used to obtain the standard resolution video, is coupled to 3-line vertical Gaussian averager 2020. The circuit 2020 includes two series one line delays 2021 and 2022, weighting amplifiers 2026, 2027, and 2028, and summing amplifier 2029. Corresponding vertical elements of three successive scanlines are coupled to the weighting amplifiers 2026, 2027, and 2028, which respectively apply weighting factors of $\frac{1}{4}$, $\frac{1}{2}$ and $\frac{1}{4}$ to the elements from the scanlines, which are then summed by summer 2029. Applicant found that a spatial frequency aliasing artifact can occur on a standard resolution receiver if alternate high resolution lines are used to generate the standard resolution signal, due to the rectangular pulse nature of the sampling window used. By summing proportionally weighted values of elements from at least three successive lines, the artifact can be substantially eliminated.

The output of circuit 2020 is coupled to solid state switching circuit 2030, which is responsive to an odd-/even line indicator 2040 to pass an output signal only during occurrence of odd lines of the high resolution video signal. Before coupling of the output of switching circuit 2030 to an analog-to-digital converter 2045, an optional time base corrector circuit 2035 can be used (since there is an output only every other line) to reduce the sampling speed requirements of the analog-to-digital converter 2045 and the size of the memory in which the standard resolution luminance is to be stored.

In order to ultimately reconstruct the high resolution image luminance, the even line signals, as well as the high frequency components of the odd line signals, are used to obtain a high band luminance signal. In the illustrated embodiment, the high resolution video from camera 10 is also coupled to a delay equalizer 2050, an output of which is coupled to the positive input terminal of a difference amplifier 2060. The difference amplifier 2060 subtracts low band components from high band components of the odd line signals, the selection of odd lines from the difference amplifier output being achieved by another switching circuit 2070 under control of odd/even line indicator 2040. The other input to switching circuit 2070 is the high band even line luminance signal. Accordingly, the output of switching circuit 2070, which is coupled to analog-to-digital converter 2080, contains the luminance components of the high resolution video signal, except for the low resolution components associated with the odd lines, which are used in generating the standard resolution signal (to avoid redundancy of this information, and save bandwidth, as in the previous embodiment).

Figure 21:
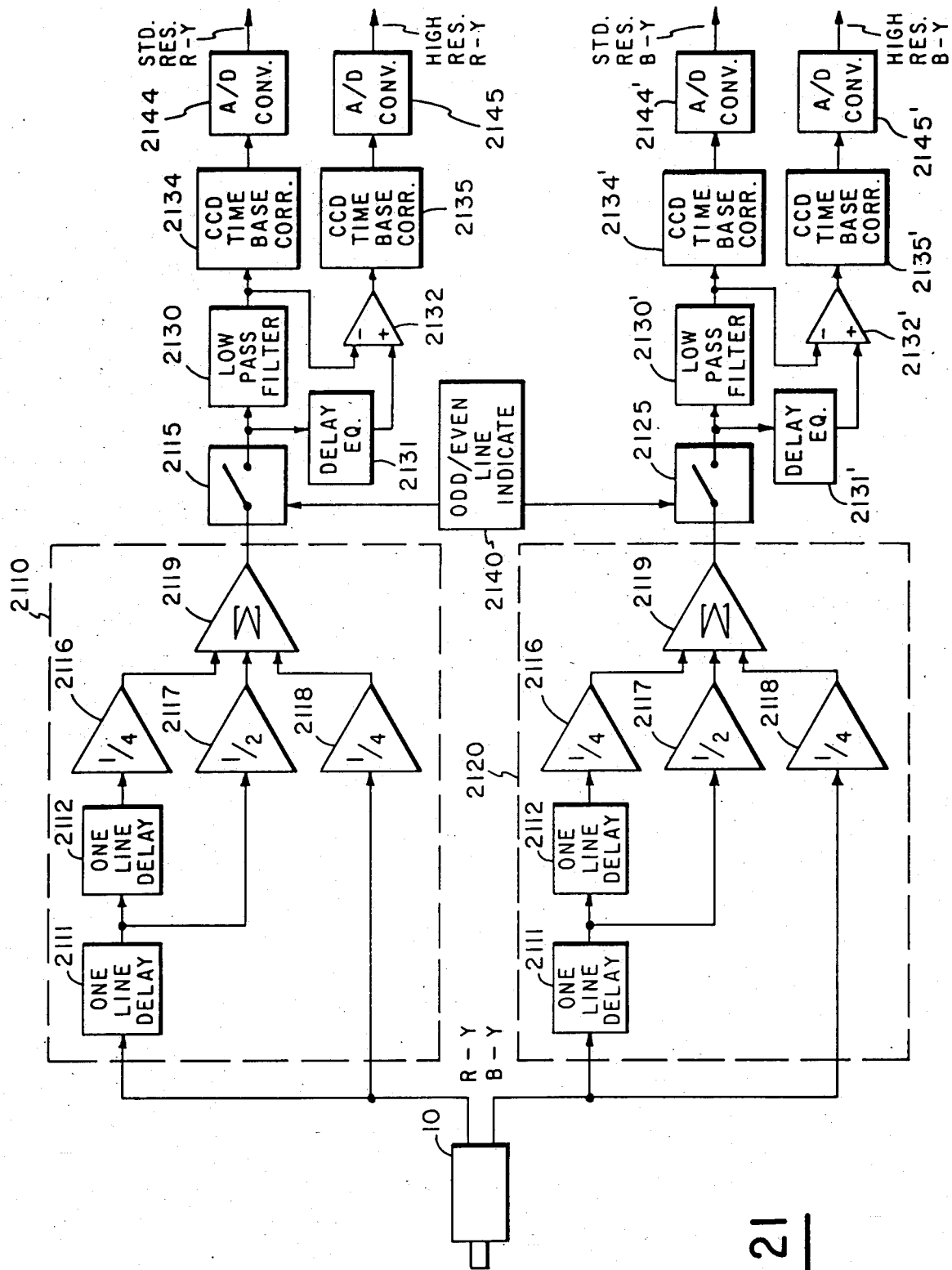
FIG. 21 shows a block diagram of the chrominance processor portion of the encoding circuitry in accordance with an embodiment of the further form of the invention.

The present embodiment illustrates the handling of color, and FIG. 21 shows a block diagram of the chrominance processor portion of the encoding circuitry. In this embodiment, color difference signals designated B-Y and R-Y are illustrated as being output from high resolution camera 10, although these can be selected at particular orthogonal reference positions of a color vectorscope that do not necessarily correspond to B-Y and R-Y. The chrominance processing of this embodiment has a number of aspects that are similar to the luminance processing described in conjunction with FIG. 20. Vertical spatial filtering is again provided by using two 1-line delays for each of the color component signals. In this case, however, standard NTSC chrominance vertical spatial frequency characteristics are adequate for high resolution color, so only the odd-line information is processed to obtain both the standard resolution color component signals and the high resolution color component signals. The R-Y and B-Y signals are respectively coupled to circuits 2110 and 2120 which operate in a manner similar to the vertical Gaussian averaging circuit 2020 of FIG. 20. In particular, each of these circuits includes a pair of 1-line delay circuits 2111 and 2112, three weighting amplifiers 2116, 2117, and 2118, and a summing amplifier 2119. The outputs of the circuits 2110 and 2120 are respectively coupled to switching circuits 2115 and 2125 which are responsive to the outputs of odd/even line indicator 2040 to pass an output signal only during occurrence of the odd lines of the high resolution video signal. The output of switching circuit 2115 is coupled to a low pass filter 2130 and is also coupled, via delay equalizer 2131, to the positive input of a difference amplifier 2132. The negative input of the difference amplifier 2132 receives the output of low pass filter 2130. The outputs of low pass filter 2130 and difference amplifier 2132 are respectively coupled to optional time base corrector circuits 2134 and 2135 which, as above, can be used to reduce the sampling speed requirements of the subsequent analog-to-digital converters and the memories in which the chrominance component signals are to be stored. The outputs of time base corrector circuits 2134 and 2135 are respectively coupled to analog-to-digital converters 2144 and 2145.

In the B-Y channel, the output of switching circuit 2125 is coupled to circuits having substantially the same functions as those set forth with respect to the R-Y channel. However, prime designations are used in indicating the reference numerals of the circuits. In this channel, the low pass filter 2130' and analog-to-digital converter 2144' can operate at lower frequency (e.g. half the frequency and half the line rate) than their counterparts in the R-Y channel. This is because of the lower bandwidth requirement of the standard resolution B-Y signal.

Figure 22:
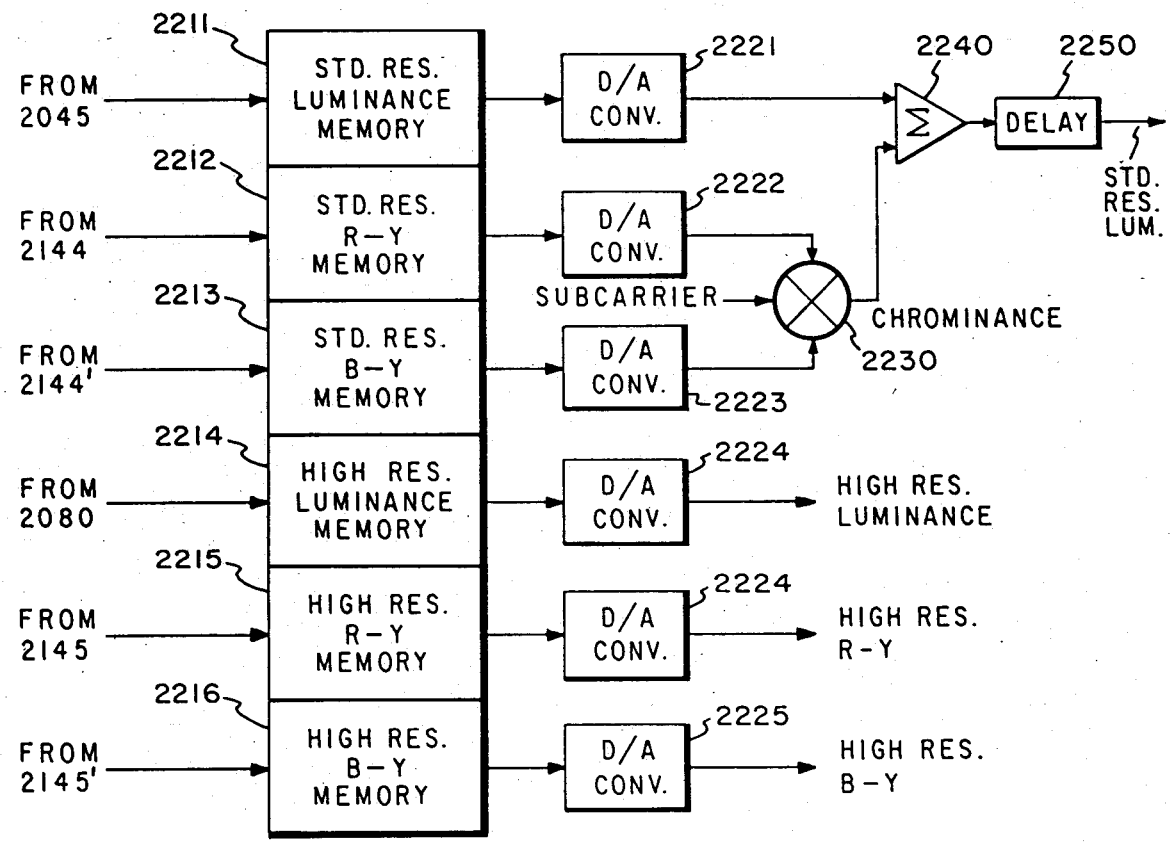
FIG. 22 shows a block diagram of memory and output circuitry portions of an embodiment of the further form of the invention.

Referring to FIG. 22, there is shown a block diagram of memory and output embodiments of the encoding circuitry (20) of the further form of the invention. The six outputs of the FIG. 21 circuitry (standard resolution luminance, R-Y, and B-Y, and high resolution luminance, R-Y and B-Y) are coupled to six memories 2211-2216, the memories being provided with independent input and output port capabilities, as described, for example, in conjunction with above first embodiment, to allow for adjustability of the input and/or output rate of the digital information stored in the memories. In an example of the present embodiment, the inputs to the memories are at the nominal rate of 30 frames per second, and the outputs of the memories holding the standard resolution signals are also at 30 frames per second (although it will be understood, throughout, that other rates can be used). The high resolution luminance output of memory 2214 has an output frame rate preferably between 3 and 15 frames per second. A rate of about 5 frames per second is considered to be suitable for maximizing the bandwidth saving while substantially maintaining high resolution integrity. In the present embodiment the high resolution R-Y frame rate is the same as the high resolution luminance frame rate, and the high resolution B-Y frame rate is preferably in the range between 3 and 30 frames per second (and can be at the nominal 30 frame per second rate without significant compromise of bandwidth, since the B-Y signal can be transmitted with only one-quarter the R-Y bandwidth, consistent with NTSC standard television).

The outputs of the memories 2211-2216 are coupled to digital-to-analog converters 2221-2226, respectively. The standard resolution color difference signals can be quadrature modulated onto a color subcarrier signal (block 2230) and the resultant chrominance signal can be combined with the luminance signal, using summer 2240, to obtain a color video signal at substantially standard resolution. The video signal is delayed by delay circuit 2250 and then transmitted and/or recorded. The high resolution signals can also be transmitted and/or recorded, such as by transmit circuitry 30 (FIG. 1). The purpose of the delay (which may alternatively be individual delays in the separate channels) is to maximize the masking of the slow buildup of the high resolution information in the ultimately displayed image, as described above, by effectively accelerating the high resolution portions of the image with respect to low resolution portions thereof. The delay is preferably in the range of 30 to 200 milliseconds. If the delay is too long, detail will appear before it is supposed to be visible.

Figure 23:
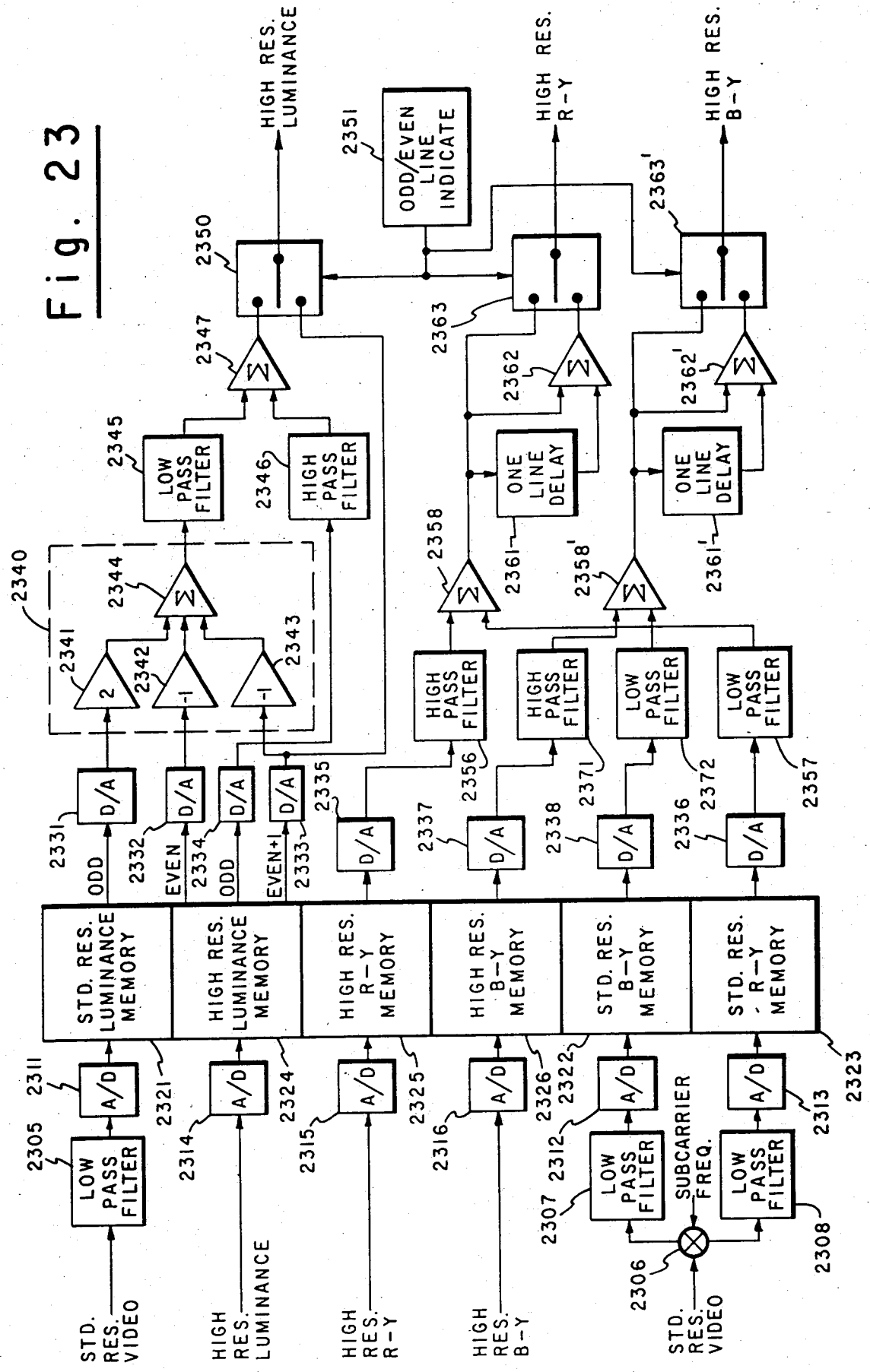
FIG. 23 is a block diagram of decoding circuitry in accordance with the further form of the invention.

Referring to FIG. 23, there is shown a block diagram of an embodiment of a decoder in accordance with the further form of the invention. It will be understood that the standard resolution video signal can be utilized by a standard resolution receiver (e.g. as illustrated in FIG. 1) after reception by receiver circuitry (40). In the high resolution decoder of FIG. 23, the standard resolution channel is coupled to a low pass filter 2305 which removes the chrominance, and also to a quadrature detector 2306 which operates in conjunction with low pass filters 2307 and 2308 to recover the color difference signals R-Y and B-Y. The recovered standard resolution signal components are coupled to analog-to-digital converters 2311, 2312, and 2213, respectively. Also, the high resolution luminance and color difference signals are respectively coupled to analog-to-digital converters 2314, 2315, and 2316. The outputs of the analog-to-digital converters are respectively coupled to six memories 2321-2326, as shown, which, as described above in conjunction with the first embodiment, can be provided with independent input and output ports which facilitate generation of the video information necessary to reconstitute the high definition frames. In this embodiment, the memories produce, inter alia, the odd scan-lines for the luminance and color difference signals, respectively, the standard resolution odd lines including weighted portions of the adjacent even lines, as previously described, to obtain vertical element averaging and artifact reduction. The low frequency signals from the standard resolution odd field lines are recovered using the circuit 2340 to "unaverage" in a vertical direction. An odd line from standard resolution luminance memory 2321, and adjacent even lines from high resolution luminance memory 2324 are coupled through respective digital-to-analog converters 2331, 2332, and 2333 to weighting amplifiers 2341, 2342, and 2343, respectively. The weighting amplifiers have respective weighting factors of 2, −1, and −1. The outputs of the weighting amplifiers are summed by summer 2344 whose output is, in turn, low pass filtered by filter 2345. The odd line output from high resolution luminance memory 2324 is coupled to digital-to-analog converter 2334, whose output is high pass filtered by filter 2346, and then coupled to one input of summer 2347, the other input to which is the output of low pass filter 2345. Accordingly, the output of summer 2347 is the recovered high resolution odd line information. [It will be understood that odd and even lines can be obtained using appropriate line delays with respect to the memory outputs, or by providing appropriate output port access for the different line information.]

The output of digital-to-analog converter 2333, which is high resolution even line information, is one input to solid state switch 2350, the other input to which is the high resolution odd line information output of summer 2347. The switch 2350 is under control of an odd/even line indicator 2351 to select either the high resolution odd line information or the high resolution even line information, depending upon the current line status.

The high resolution color difference signals are recovered in a similar manner. In this case, the low and high resolution R-Y signals from memories 2325 and 2323 are respectively coupled to digital-to-analog converters 2335 and 2336, and the analog outputs thereof are respectively high pass filtered and low pass filtered by filters 2356 and 2357. The outputs of filters 2356 and 2357 are input to a summer 2358 whose output will therefore constitute the odd line R-Y signal (remembering that the color difference signals were obtained only from the odd lines). The output of summer 2358 is coupled to a one line delay 2361 whose output is one input to another summer 2362. The other input to summer 2362 is the output of summer 2358. The summer 2362 has an inherent weighting factor of ½, so that its output is an average of successive odd lines. A solid state switch 2363 is then used to alternate between the odd line output of summer 2358, and the even line output of summer 2362 that is derived from averaging odd lines. The output of the solid state switch contains the high resolution R-Y signal.

The high resolution B-Y signal is recovered in the same manner as the R-Y signal. In particular, the outputs of high resolution and standard resolution B-Y memories are coupled to digital-to-analog converters 2337 and 2338 and then respectively filtered by filters 2371 and 2372, whose outputs are coupled to summer 2358′. The summer 2358′, one line delay 2361′, summer 2362′, and switch 2363′, then operate in the same manner as their counterparts in the R-Y circuitry to obtain the B-Y high resolution signal. The high resolution luminance and color difference signals can then be conventionally decoded and applied to high resolution display 60.

It will be recognized by those skilled in the art that further variations can be implemented within the spirit and scope of the invention. For example, if required by broadcast standards a "high resolution signal killer" could be utilized in high definition receivers when low resolution broadcasts are being received. Also, while a double interlace scheme has been illustrated, it will be understood that alternatives, such as triple interlace, can be used. Further, and as referred to above, the standard frame rate can be other than the 30 frames per second NTSC rate used in the United States, and the invention has applicability to any type of video system. Finally, it is noted that integrated circuit technology can be employed to implement some or all of the encoder or the decoder, such as for home receiver use.

I claim:

1. Apparatus for encoding and decoding a video signal, comprising:
   (A) an encoder, including:
   means responsive to said video signal for deriving a representation of low spatial frequency components of the images represented by said video signal;
   means responsive to said video signal for deriving a representation which includes high spatial frequency components of the images represented by said video signal;
   means for producing output frames of said low spatial frequency component representation at a fast frame refresh rate;
   means for producing output frames of said high spatial frequency component representation at a slow frame refresh rate in the range of 3 to 15 frames per second; and
   means for delaying said output frames of low spatial frequency component representation with respect to said output frames of high spatial frequency component representation; and
   (B) a decoder, including means for combining the low spatial frequency component representation with the high spatial frequency component representation to obtain a decoded video signal.

2. Apparatus as defined by claim 1, wherein said delaying means introduces a delay in the range 30 to 200 milliseconds.

3. Apparatus for encoding and decoding a video signal, comprising:
   (A) an encoder, including:
   means responsive to said video signal for deriving a representation of low spatial frequency components of the images represented by said video signal;
   means responsive to said video signal for deriving a representation which includes high spatial frequency components of the images represented by said video signal;
   means for producing output frames of said low spatial frequency component representation at a fast frame refresh rate;
   means for producing output frames of said high spatial frequency component representation at a slow frame refresh rate;
   means for delaying said output frames of low spatial frequency component representation with respect to said output frames of high spatial frequency component representation; and
   (B) a decoder, including means for combining the delayed low spatial frequency component representation with the high spatial frequency component representation to obtain a decoded video signal.

4. Apparatus as defined by claim 3, wherein said delay means introduces a delay in the range 30 to 200 milliseconds.

5. Apparatus as defined by claim 3, wherein said video signal is a color video signal, said component representations are set forth for luminance and two color difference signals at about R-Y and B-Y, and wherein said delaying means apply delays of output frames of low spatial frequency component representation with respect to output frames of high spatial frequency component representation for luminance and each color difference signal.

6. Apparatus as defined by claim 5, wherein the delays introduced with respect to the luminance and each color difference signal are in the range 30 to 200 milliseconds.

7. Apparatus for encoding and decoding a video signal having frames of scanlines, comprising:
(A) an encoder, including: means for deriving a representation of low spatial frequency components of the images represented by said video signal, by low pass filtering said video signal and forming weighted sums of corresponding elements of three consecutive scanlines, centered around every other scanline of a frame;
means for deriving a representation which includes high spatial frequency components of the images represented by said video signal, by selecting alternately the high frequency signal components of said every other scanlines, and the low and high frequency signal components of the scanlines between said every other scanlines;
means for producing output frames of said low spatial frequency component representation at a fast frame refresh rate;
means for producing output frames of said high spatial frequency component representation at a slow frame refresh rate; and
(B) a decoder, including means for combining the low spatial frequency component representation with the high spatial frequency component representation to obtain a decoded video signal.

8. Apparatus as defined by claim 7, wherein said encoder includes means for delaying said output frames of low spatial frequency component representation with respect to said output frames of high spatial frequency component representation.

9. Apparatus as defined by claim 7, wherein said slow frame refresh rate is in the range of 3 to 15 frames per second.

10. Apparatus as defined by claim 8, wherein said slow frame refresh rate is in the range of 3 to 15 frames per second.

11. For use in decoding signals from an encoder which includes: means responsive to said video signal for deriving a representation of low spatial frequency components of the images represented by said video signal; means responsive to said video signal for deriving a representation which includes high spatial frequency components of the images represented by said video signal; means for producing output frames of said low spatial frequency component representation at a fast frame refresh rate; means for producing output frames of said high spatial frequency component representation at a slow frame refresh rate; and means for delaying said output frames of low spatial frequency component representation with respect to said output frames of high spatial frequency component representation; a decoding method, comprising:
combining the delayed low spatial frequency component representation with the high spatial frequency component representation to obtain a decoded video signal; and
displaying said decoded video signal.

12. A method for encoding and decoding a video signal, comprising the steps of:
(A) encoding the video signal, by:
deriving a representation of low spatial frequency components of the images represented by said video signal;
deriving a representation which includes high spatial frequency components of the images represented by said video signal;
producing output frames of said low spatial frequency component representation at a fast frame refresh rate;
producing output frames of said high spatial frequency component representation at a slow frame refresh rate in the range of 3 to 15 frames per second; and
delaying said output frames of low spatial frequency component representation with respect to said output frames of high spatial frequency component representation; and
(B) decoding the encoded signal by combining the low spatial frequency component representation with the high spatial frequency component representation converted from a slow frame rate refresh rate in the range of 3 to 15 per second to the frame refresh rate of the frames of low spatial frequency component representation.

13. The method as defined by claim 12, wherein said delaying comprises introducing a delay in the range 30 to 200 milliseconds.

14. A method for encoding and decoding a video signal, comprising the steps of:
(A) encoding the video signal, by:
deriving a representation of low spatial frequency components of the images represented by said video signal;
deriving a representation which includes high spatial frequency components of the images represented by said video signal;
producing output frames of said low spatial frequency component representation at a fast frame refresh rate;
producing output frames of said high spatial frequency component representation at a slow frame refresh rate;
delaying said output frames of low spatial frequency component representation with respect to said output frames of high spatial frequency component representation; and
(B) decoding the encoded signals by combining the delayed low spatial frequency component representation with the high spatial frequency component representation to obtain a decoded video signal.

15. The method as defined by claim 14, wherein said delaying comprises introducing a delay in the range 30 to 200 milliseconds.

16. Apparatus for encoding and decoding a color video signal comprising:
(A) an encoder, including:

means responsive to said video signal for deriving a representation of low spatial frequency components, for luminance and two color difference signals at about R-Y and B-Y, of the images represented by said video signal;

means responsive to said video signal for deriving a representation which includes high spatial frequency components, for luminance and two color difference signals at about R-Y and B-Y, of the images represented by said video signal;

means for producing output frames of said low spatial frequency component representation at a fast frame refresh rate;

means for producing output frames of said high spatial frequency component representation at slow frame refresh rates in the ranges 3 to 15 frames per second, for luminance, 3 to 15 frames per second, for R-Y, and 3 to 30 frames per second for B-Y, at least one of said slow frame refresh rates being different than the others; and (B) a decoder, including means for combining the low spatial frequency component representation with the high spatial frequency component representation to obtain a decoded video signal.

17. Apparatus as defined by claim 16, wherein said encoder includes means for delaying said output frames of low spatial frequency component representation with respect to said output frames of high spatial frequency component representation.

18. Apparatus as defined by claim 17, wherein said delaying means introduces a delay in the range 30 to 200 milliseconds.

* * * * *